(12) United States Patent
Granade et al.

(10) Patent No.: US 11,120,359 B2
(45) Date of Patent: Sep. 14, 2021

(54) PHASE ESTIMATION WITH RANDOMIZED HAMILTONIANS

(71) Applicant: Microsoft Technology Licensing, LLC, Redmond, WA (US)

(72) Inventors: Christopher Granade, Redmond, WA (US); Nathan O. Wiebe, Redmond, WA (US); Ian Kivlichan, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 16/430,205

(22) Filed: Jun. 3, 2019

(65) Prior Publication Data

US 2020/0293936 A1   Sep. 17, 2020

Related U.S. Application Data

(60) Provisional application No. 62/819,301, filed on Mar. 15, 2019.

(51) Int. Cl.
*G06N 10/00* (2019.01)
(52) U.S. Cl.
CPC .................... *G06N 10/00* (2019.01)
(58) Field of Classification Search
None
See application file for complete search history.

(56) References Cited

U.S. PATENT DOCUMENTS

| 9,275,011 B2 | 3/2016 | Freedman et al. | |
| 2018/0053112 A1* | 2/2018 | Bravyi | G06N 10/00 |
| 2018/0137422 A1 | 5/2018 | Wiebe et al. | |
| 2019/0095811 A1* | 3/2019 | Antonio | G06N 10/00 |
| 2020/0117702 A1* | 4/2020 | Babbush | G06N 10/00 |

OTHER PUBLICATIONS

Brown et al., "Using Quantum Computers for Quantum Simulation," *Entropy*, 12: 2268-2307 (Nov. 2010).
Campbell, "A random compiler for fast Hamiltonian simulation," arXiv:1811.08017, 7 pp. (Nov. 2018).
Childs et al., "Faster quantum simulation by randomization," arXiv:1805.08385v1, 19 pp. (May 2018).
International Search Report and Written Opinion dated Jul. 3, 2020, from International Patent Application No. PCT/US2020/022684, 11 pp.
Montanaro, "Advanced Quantum Information Theory, Lecture Notes," *CDT in Quantum Engineering*, 58 pp. (Jan. 2015).
Yung et al., "Introduction to Quantum Algorithms for Physics and Chemistry," arXiv:1203.1331v1, 45 pp. (Mar. 2012).

* cited by examiner

*Primary Examiner* — Jay C Chang
(74) *Attorney, Agent, or Firm* — Klarquist Sparkman, LLP

(57) ABSTRACT

Existing methods for dynamical simulation of physical systems use either a deterministic or random selection of terms in the Hamiltonian. In this application, example approaches are disclosed where the Hamiltonian terms are randomized and the precision of the randomly drawn approximation is adapted as the required precision in phase estimation increases. This reduces both the number of quantum gates needed and in some cases reduces the number of quantum bits used in the simulation.

20 Claims, 16 Drawing Sheets

PHASE ESTIMATION WITH RANDOMIZED HAMILTONIANS

CROSS REFERENCE TO RELATED APPLICATIONS

This application claims the benefit of U.S. Provisional Application No. 62/819,301 entitled "PHASE ESTIMATION WITH RANDOMIZED HAMILTONIANS" and filed on Mar. 15, 2019, which is hereby incorporated herein by reference in its entirety.

FIELD

This application relates generally to quantum computing. In more detail, example approaches are disclosed where Hamiltonian terms are randomized and the precision of the randomly drawn approximation is adapted as the required precision in phase estimation increases.

SUMMARY

Existing methods for dynamical simulation of physical systems use either a deterministic or random selection of terms in the Hamiltonian. In this disclosure, example approaches are disclosed where the Hamiltonian terms are randomized and the precision of the randomly drawn approximation is adapted as the required precision in phase estimation increases. This reduces both the number of quantum gates needed and in some cases reduces the number of quantum bits used in the simulation.

Embodiments comprise randomizing phase estimation by replacing the Hamiltonian with a randomly generated one each time it is simulated. Further embodiments involve the use of randomization within an iterative phase estimation algorithm to select Hamiltonian terms for inclusion in the approximation as well as their ordering. Certain embodiments involve the use of importance functionals based on the significance of the term in the groundstate to determine whether it gets included in the randomly sampled Hamiltonian. Further embodiments involve the use of importance sampling based on the variational approximations to the groundstates, such as but not limited to, CISD states. Certain embodiments involve the use of adaptive Bayesian methods in concert with this process to quantify the precision of the Hamiltonian needed given the current uncertainty in the eigenvalue that the algorithm is estimating.

In this application, example methods for performing a quantum simulation using adaptive Hamiltonian randomization. The particular embodiments described should not be construed as limiting, as the disclosed method acts can be performed alone, in different orders, or at least partially simultaneously with one another. Further, any of the disclosed methods or method acts can be performed with any other methods or method acts disclosed herein. In particular embodiments, a Hamiltonian to be computed by the quantum computer device is inputted; a number of Hamiltonian terms in the Hamiltonian is reduced using randomization within a phase estimation algorithm; and a quantum circuit description for the Hamiltonian is output with the reduced number of Hamiltonian terms.

In certain embodiments, the reducing comprises selecting one or more random Hamiltonian terms based on an importance function; reweighting the selected random Hamiltonian terms based on an importance of each of the selected Hamiltonian random terms; and generating the quantum circuit description using the reweighted random terms.

Some embodiments further comprise implementing, in the quantum computing device, a quantum circuit as described by the quantum circuit description; and measuring a quantum state of the quantum circuit. Still further embodiments comprise re-performing the method based on results from the measuring (e.g., using an iterative process). In some embodiments, the iterative process comprises computing a desired precision value for the Hamiltonian; computing a standard deviation for the Hamiltonian based on results from the implementing and measuring; and comparing the desired precision value to the standard deviation. Some embodiments further comprise changing an order of the Hamiltonian terms based on the reducing. Certain embodiments further comprise applying importance functions to terms of the Hamiltonian in a ground state; and selecting one or more random Hamiltonian terms based at least in part on the importance functions. Some embodiments comprise using importance sampling based on a variational approximation to a groundstate. Certain embodiments further comprise using adaptive Bayesian methods to quantify a precision needed for the Hamiltonian given an estimate of the current uncertainty in an eigenvalue.

Other embodiments comprise one or more computer-readable media storing computer-executable instructions, which when executed by a computer cause the computer to perform a method comprising inputting a Hamiltonian to be computed by the quantum computer device; reducing a number of Hamiltonian terms in the Hamiltonian using randomization within a phase estimation algorithm; and outputting a quantum circuit description for the Hamiltonian with the reduced number of Hamiltonian terms.

The foregoing and other objects, features, and advantages of the disclosed technology will become more apparent from the following detailed description, which proceeds with reference to the accompanying figures.

DETAILED DESCRIPTION

I. Introduction

Figure 1:
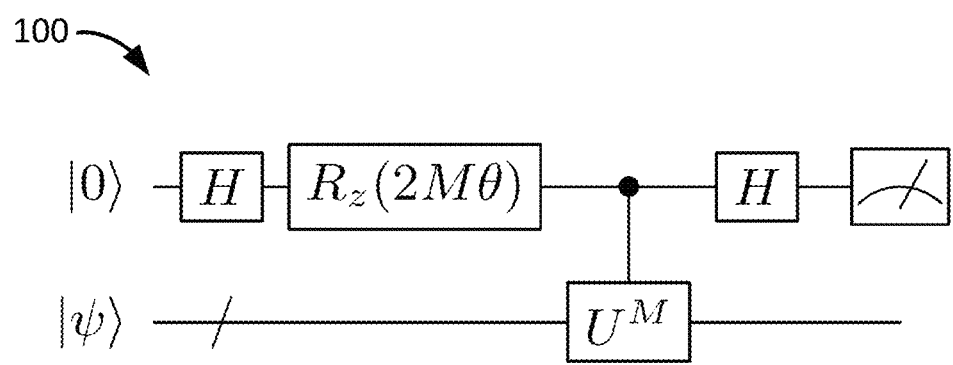
FIG. 1 shows a quantum circuit for performing iterative phase estimation.
Figure 2:
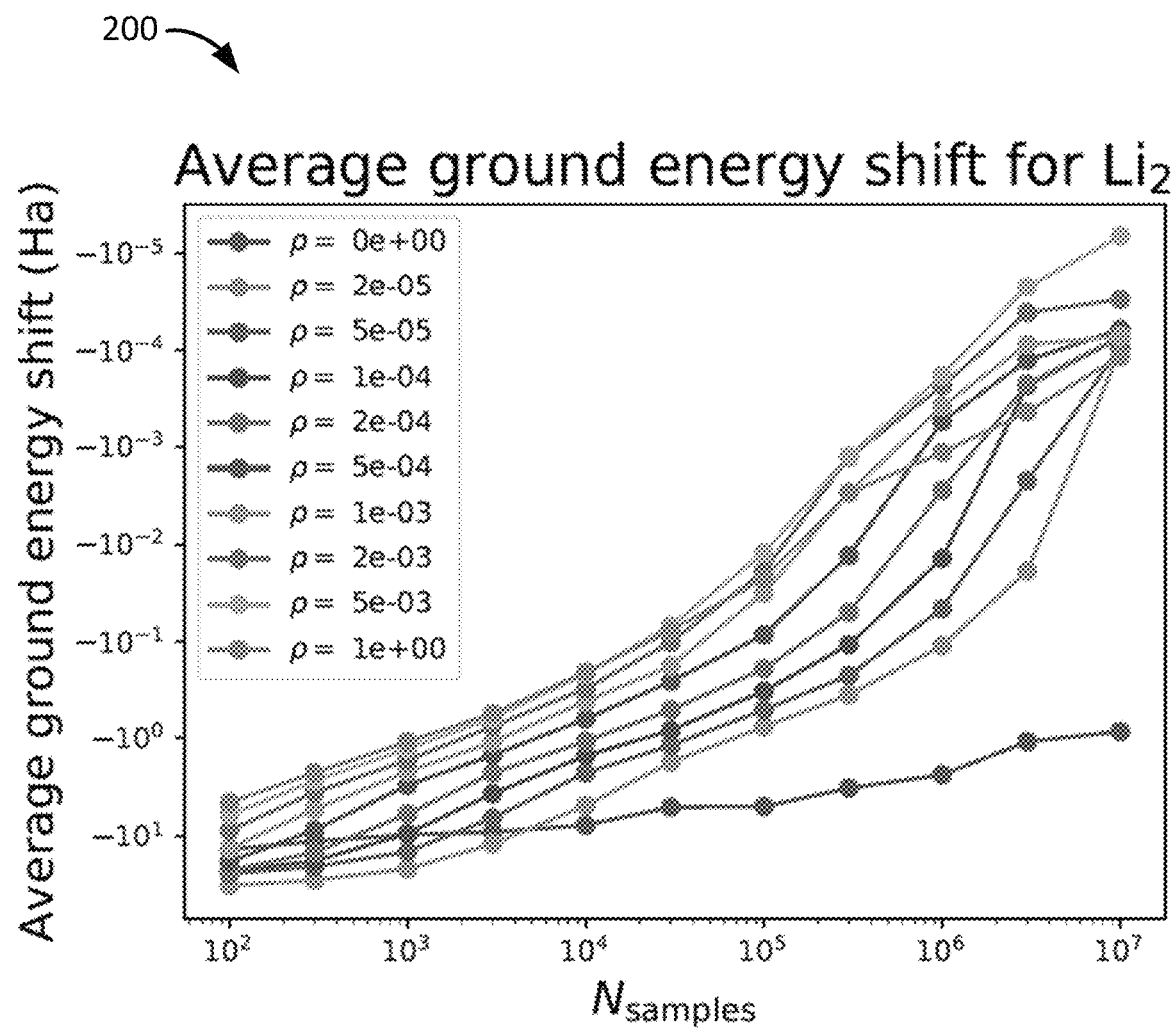
FIGS. 2-9 comprise graphs that show the average ground energy shift (compared to unsampled Hamiltonian), variance in ground energies over sampled Hamiltonians, average qubit requirement, and average number of terms in sampled Hamiltonians for $Li_2$, as a function of number of samples taken to generate the Hamiltonian and the value of the parameter p.
Figure 3:
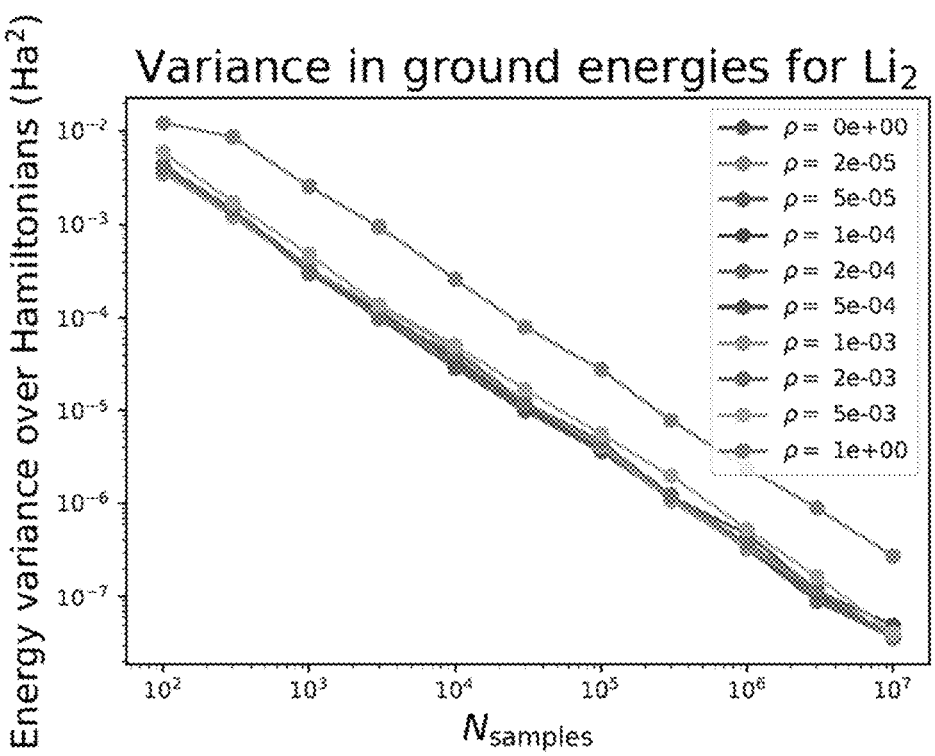
Figure 4:
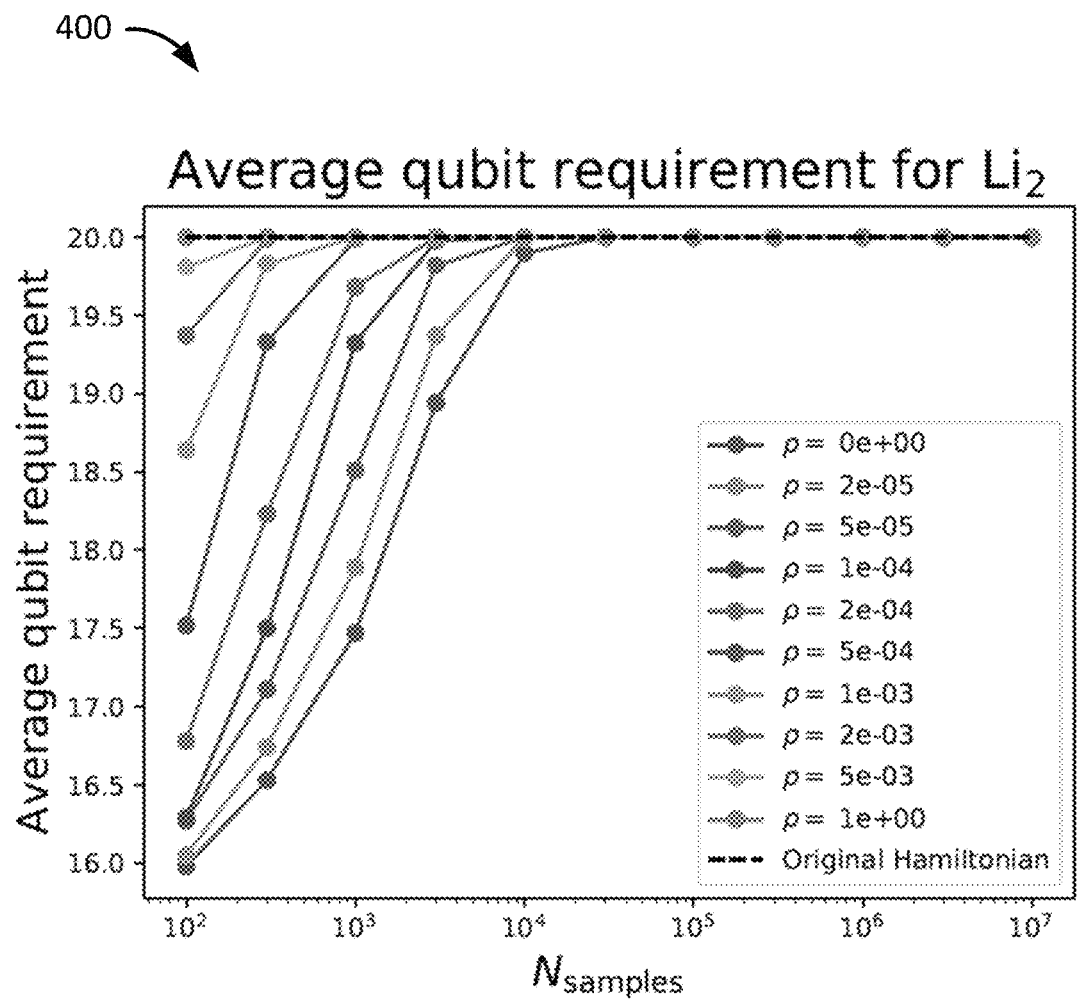
Figure 5:
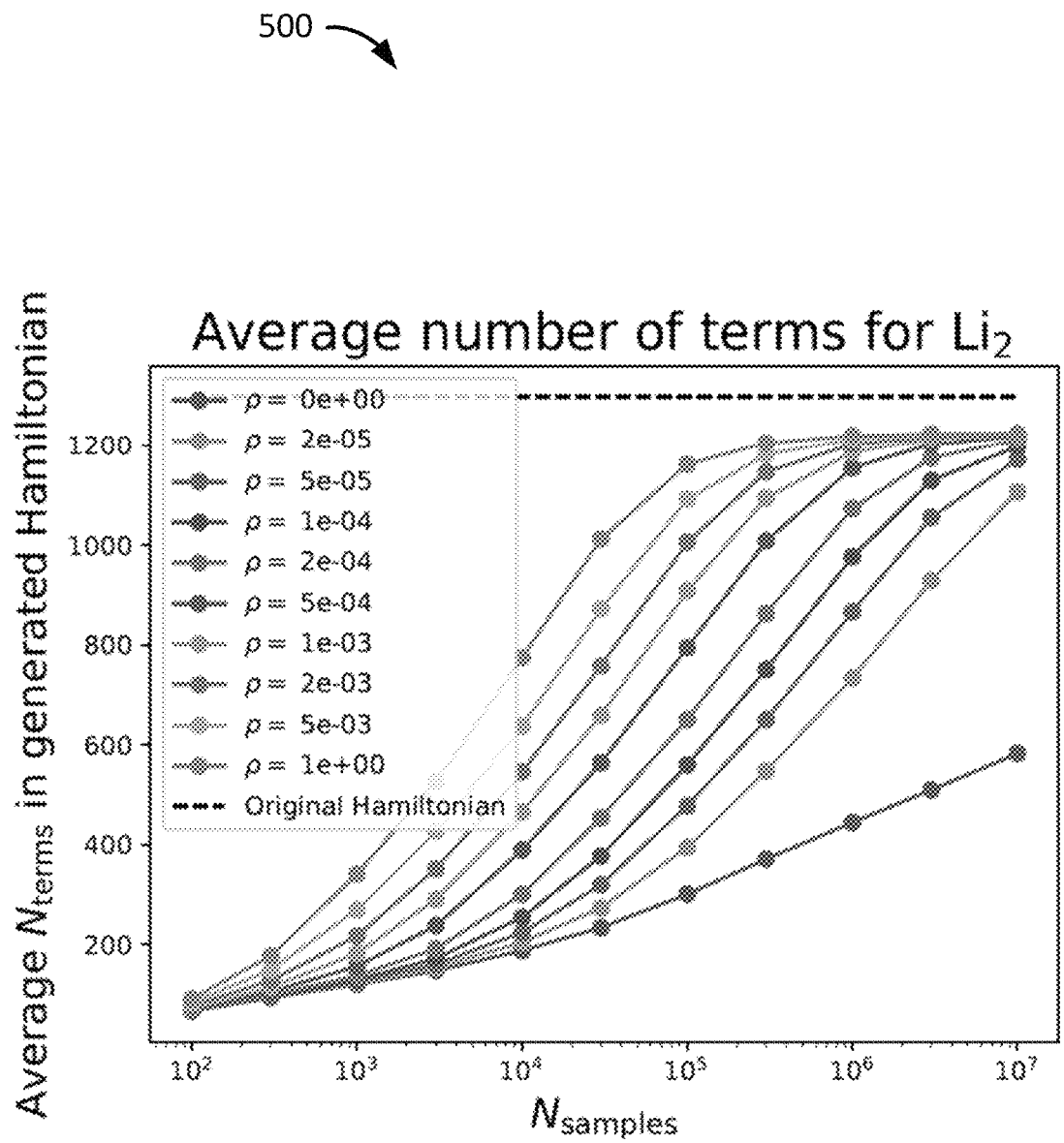
Figure 6:
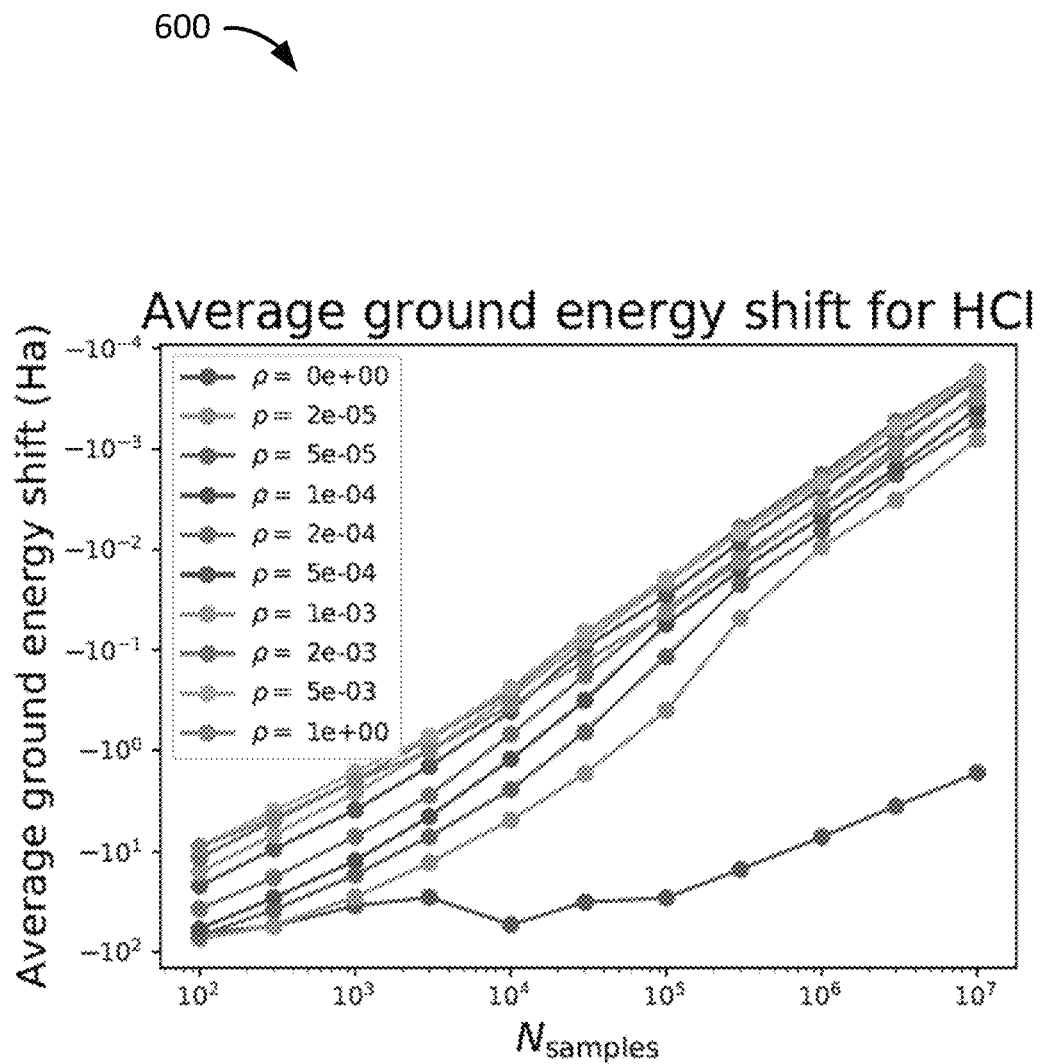
Figure 7:
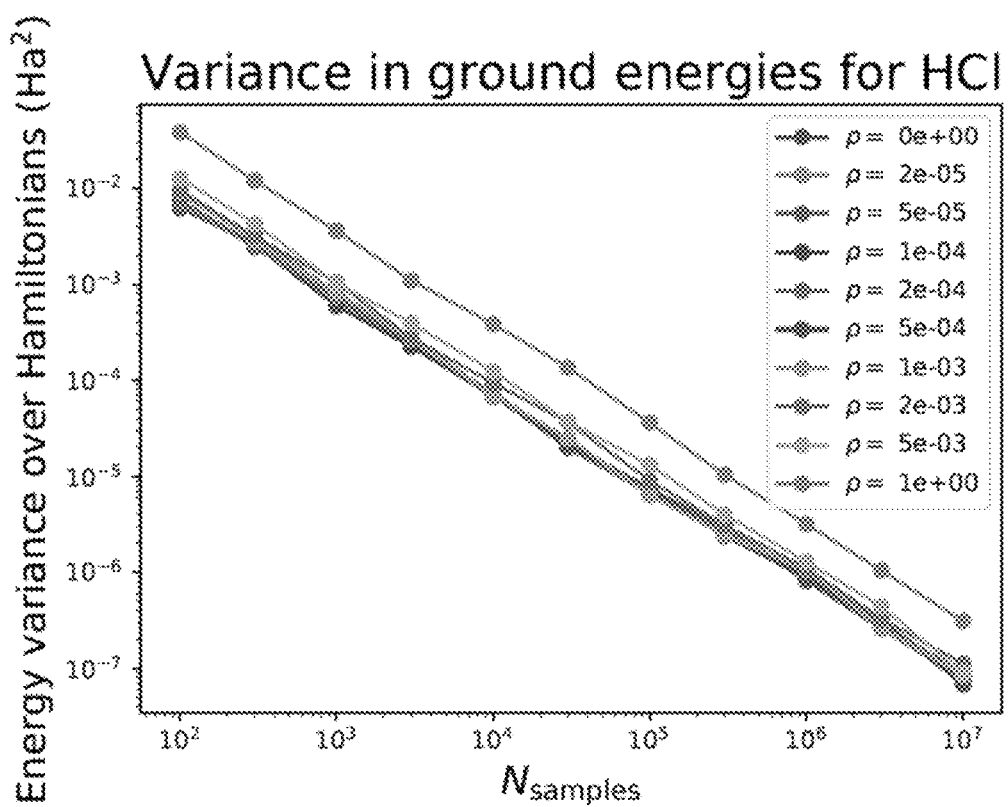
Figure 8:
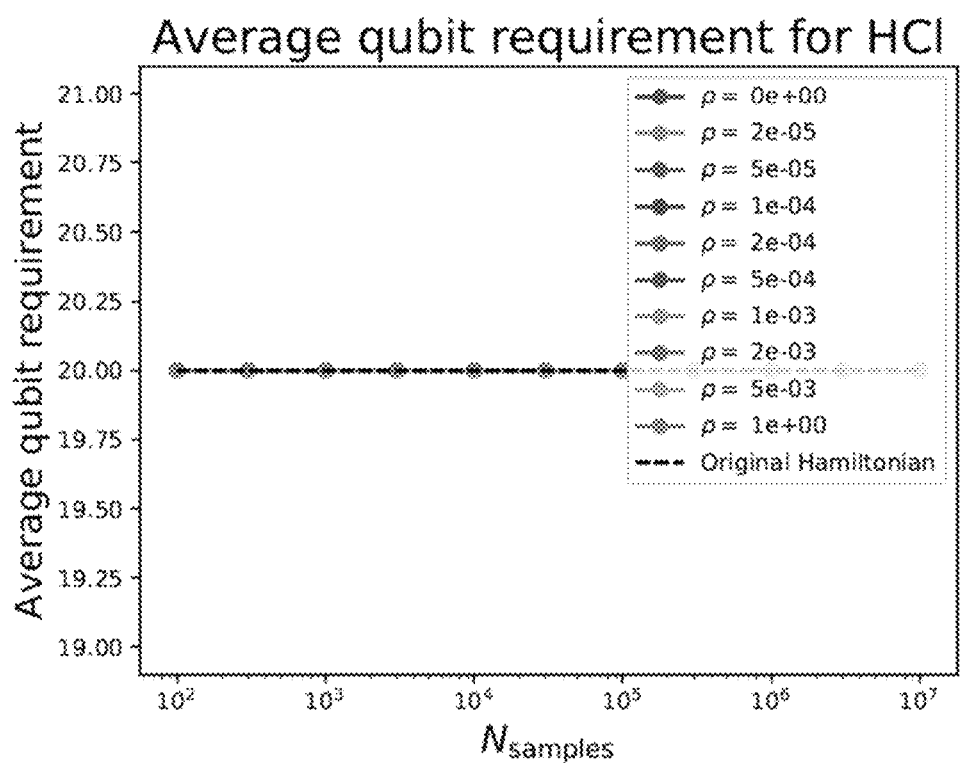
Figure 9:
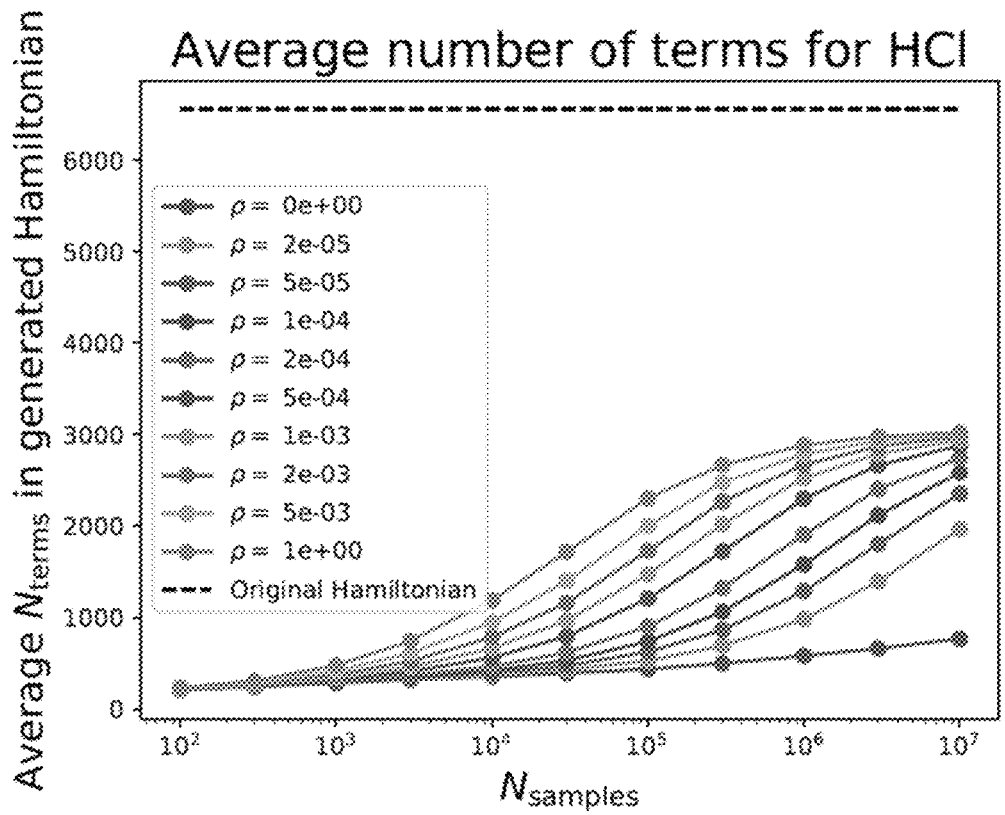

Not all Hamiltonian terms are created equally in quantum simulation. Hamiltonians that naturally arise from chemistry, materials and other applications often are composed of terms that are negligibly small. These terms are often culled from the Hamiltonian well before it hits the simulator. Other terms that are formally present in the Hamiltonian are removed, not because of their norm, but rather because they are not expected to impact the quantity of interest. For example, in quantum chemistry one usually selects an active space of orbitals and ignores any orbitals outside the active space. This causes many large terms to be omitted from the Hamiltonian.

This process, often called decimation, often involves systematically removing terms from the Hamiltonian and simulating the dynamics. The idea behind such a scheme is to remove terms in the Hamiltonian until the maximum shift allowed in the eigenvalues is comparable to the level of precision needed. For the case of chemistry, chemical accuracy sets a natural accuracy threshold for such simulations, but in general this precision requirement need not be viewed as a constant.

One of the example innovations of this disclosure is that, in iterative phase estimation, the number of terms taken in the Hamiltonian should ideally not be held constant. The reason why is that the high-order bits are mostly irrelevant when one is trying to learn, for example, a given bit of a binary expansion of the eigenphase. A much lower accuracy simulation can be tolerated than it can when learning a high-order bit. It then makes sense to adapt the number of terms in the Hamiltonian as iterative phase estimation proceeds through the bits of the phase estimation. Example embodiments of the disclosed technology provide a systematic method for removing terms and provides formal proofs that such processes need not dramatically affect the results of phase estimation nor its success probability.

One of the concepts behind the example advanced decimation procedure is that a form of importance sampling is used to estimate, a priori, which terms in the Hamiltonian are significant. These randomized Hamiltonians are then used within a simulation circuit to prepare approximate ground states. It is then shown that, using analysis that is reminiscent of that behind the Zeno effect or the quantum adiabatic theorem, that the errors in the eigenstate prepared at each round of phase estimation need not have a substantial impact on the posterior mean of the eigenphase estimated for the true Hamiltonian. This shows, under appropriate assumptions on the eigenvalue gaps, that this process can be used to reduce the time complexity of simulation and even under some circumstances reduce the space complexity by identifying qubits that are not needed for the level of precision asked of the simulation.

The disclosure proceeds by first reviewing iterative phase estimation and Bayesian inference, which are used to quantify the maximal error in the inference of the phase. The disclosure then proceeds to examine the effect of using a stochastic Hamiltonian on the eigenphases yielded by phase estimation in the simple case where a fixed, but random, Hamiltonian is used at each step of iterative phase estimation. The more complicated case is then examined where each repetition of $e^{-iHt}$ in the iterative phase estimation circuit is implemented with a different random Hamiltonian. The theoretical analysis concludes by showing that the success probability is not degraded substantially if the eigenvalue gaps of the original Hamiltonian are sufficiently large. Further, numerical examples of this sampling procedure are shown and from that it can be concluded that the example sampling process for the Hamiltonian can have a substantial impact on the number of terms in the Hamiltonian and even in some cases the number of qubits used in the simulation.

II. Iterative Phase Estimation

The idea behind iterative phase estimation is based on the aim to build a quantum circuit that acts as an interferometer wherein the unitary one wishes to probe is applied in one of the two branches of the interferometer but not applied in the other. When the quantum state is allowed to interfere with itself at the end of the protocol the interference pattern reveals the eigenphase. This process allows the eigenvalues of U to be estimated within the standard quantum limit (i.e. the number of applications of U needed to estimate the phase within error $\epsilon$ is in $\Theta(1/\epsilon^2)$. If the quantum state is allowed to pass repeatedly through the interferometer circuit (or entangled inputs are used) then this scaling can be reduced to $\Theta(1/\epsilon)$ which is known as the Heisenberg limit. Such a circuit is shown in schematic block diagram 100 of FIG. 1. In particular, FIG. 1 shows a quantum circuit for performing iterative phase estimation. M is the number of repetitions of the unitary U (not necessarily an integer), and $\theta$ is a phase offset between the ancilla $|0\rangle$ and $|1\rangle$ states.

The phase estimation circuit is easy to analyze in the case where $U|\psi\rangle = e^{i\phi}|\psi\rangle$. If U is repeated M times and $\theta$ is a phase offset then the likelihood of a given measurement outcome $o \in \{0, 1\}$ for the circuit in FIG. 1 with these parameters is $$Pr(o \mid \phi; M, \theta) = \frac{1 + (-1)^o \cos(M(\theta - \phi))}{2}. \qquad (1)$$

There are many free parameters that can be used when designing iterative phase estimation experiments. In particular, the rules for generating M and $\theta$ for each experiment vary radically along with the methods used to process the data that comes back from these experiments. Approaches such as Kitaev's phase estimation algorithm, robust phase estimation, information theory phase estimation, or any number of approximate Bayesian methods, provide good heuristics for picking these parameters. In this disclosure, it is assumed that one does not wish to specify to any of these methods for choosing experiments, nor does one wish to focus on the specific data processing methods used. Nonetheless, Bayesian methods are relied on to discuss the impact that randomizing the Hamiltonian can have on an estimate of the eigenphase.

Bayes' theorem can be interpreted as giving the correct way to update beliefs about some fact given a set of experimental evidence and prior beliefs. The initial beliefs of the experimentalist are encoded by a prior distribution $Pr(\phi)$. In many cases, it is appropriate to set $Pr(\phi)$ to be a uniform distribution on $[0, 2\pi)$ to represent a state of maximal ignorance about the eigenphase. However, in quantum simulation broader priors can be chosen if each step in phase estimation uses $U_j = e^{-iHt_j}$ and obeys $U_j|\psi\rangle =$ $e^{-iE_0t_j}|\psi\rangle$ for different $t_j$, since such experiments can learn $E_0$ as opposed to experiments with a fixed t which yield $\phi=E_0 t$ mod $2\pi$.

Bayes' theorem then gives the posterior distribution $Pr(\phi|o; \phi, M)$ to be $$Pr(\phi \mid o; \phi, M) = \frac{Pr(o \mid \phi; M, \theta)Pr(\phi)}{\int Pr(o \mid \phi; M, \theta)Pr(\phi)d\phi}. \quad (2)$$

Given a complete data set rather than a single datum, one has that $$Pr(\vec{\phi} \mid \vec{o}; \phi, \vec{M}) = \frac{\prod_j Pr(o_j \mid \phi; M_j, \theta_j)Pr(\phi)}{\int \prod_j Pr(o_j \mid \phi; M_j, \theta_j)Pr(\phi)d\phi}. \quad (3)$$

This probability distribution encodes the experimentalist's entire state of knowledge about $\phi$ given that the data is processed optimally.

It is not customary to return the posterior distribution (or an approximation thereof) as output from a phase estimation protocol. Instead, a point estimate for $\phi$ is given. The most frequently used estimate is the maximum a posteriori (MAP) estimate which is simply the d that has the maximum probability. While this quantity has a nice operational interpretation, it suffers from a number of deficiencies for purposes of this disclosure. The main drawback here is that the MAP estimate is not robust, in the sense that if two different values of $\phi$ have comparable likelihoods then small errors in the likelihood can lead to radical shifts in the MAP estimate. The posterior mean is a better estimate for this purpose, which formally is $\int Pr(\phi|\vec{o}; \vec{M}, \vec{\theta})\phi d\phi$. The posterior mean can be seen as the estimate that reduces the mean square error in any unbiased estimate of $\phi$ and thus it is well motivated. It also has the property that it is robust to small perturbations in the likelihood, which is a feature that is used below to estimate the impact on the results of a phase estimation experiment.

III. Errors in Likelihood Function

A. Linear Combinations of Unitaries

Linear combination of unitary methods for quantum simulation have rapidly become a favored method for simulating Hamiltonian dynamics in quantum systems. Unlike Trotter decompositions, many of these methods do not necessarily yield a unitary approximation to the simulated quantum dynamics. This means that it is impossible to use Stone's theorem directly to argue that the linear combination of unitaries method implements $e^{-i\tilde{H}t}$ in place of $e^{-iHt}$. In turn, since the standard analysis of the error propagation from Trotter decompositions to the estimated phase in iterative phase estimation fails because one cannot reason about the eigenvalues of $\tilde{H}$ directly.

Here, to address this in part, a discussion is provided of the impact that such errors can have on the likelihood function for iterative phase estimation.

Lemma 1. Let V be a possibly non-unitary operation that can be non-deterministically performed by a quantum computer in a controlled fashion such that there exists a unitary U with $\|U-V\| \leq \delta < 1$. If one defines the likelihood function post-selected on V succeeding to be $\tilde{P}(o|Et; M, \theta)$ then $$|P(o \mid Et, M, \theta) - \tilde{P}(o \mid Et, M, \theta)| \leq \frac{\delta}{1-\delta}.$$

Proof. Let one assume that o=0. Then, one has that for input state $|\psi\rangle$ the error in the likelihood function output by iterative phase estimation is $$|P(0 \mid Et, M, \theta) - \tilde{P}(0 \mid Et, M, \theta)| = \quad (4)$$

$$\left|Tr\left(\left[\frac{Ue^{i\theta}|\psi\rangle\langle\psi| + e^{-i\theta}|\psi\rangle\langle\psi|U^\dagger}{4}\right] - \left[\frac{Ve^{i\theta}|\psi\rangle\langle\psi| + e^{-i\theta}|\psi\rangle\langle\psi|V^\dagger}{4\||V|\psi\rangle\|}\right]\right)\right| \leq$$

$$\frac{1}{2}\left|Tr\left(U|\psi\rangle\langle\psi| - \frac{V|\psi\rangle\langle\psi|}{\||V|\psi\rangle\|}\right)\right| \leq$$

$$\frac{1}{2}|Tr(U|\psi\rangle\langle\psi| - V|\psi\rangle\langle\psi|)| + \frac{1}{2}\left|Tr\left(V|\psi\rangle\langle\psi| - \frac{V|\psi\rangle\langle\psi|}{\||V|\psi\rangle\|}\right)\right| \leq$$

$$\frac{\delta}{2} + \frac{\|V\|}{2}\left(\frac{1}{1-\delta} - 1\right) \leq \frac{\delta}{2} + \frac{1+\delta}{2}\left(\frac{\delta}{1-\delta}\right) = \frac{\delta}{1-\delta}.$$

Since $P(0|Et; M, \theta)+P(1|Et; M, \theta)=1$ it follows that the same bound must apply for o=1 as well. Thus the result holds for any o as claimed.

This result, while straight forward, is significant because it allows the maximum errors in the mean of the posterior distribution to be propagated through the iterative phase estimation protocol. The ability to propagate these errors will ultimately allow us to show that iterative phase estimation can be used to estimate eigenvalues from linear combinations of unitary methods.

B. Subsampling Hamiltonians

The case where terms are sampled uniformly from the Hamiltonian is now considered. Let the Hamiltonian be a sum of L simulable Hamiltonians $H_l$, $H \sum_{\ell=1}^{L} H_\ell$, Throughout, an eigenstate $|\psi\rangle$ of H and its corresponding eigenenergy E is considered. From the original, one can construct a new Hamiltonian $$H_{est} = \frac{L}{m}\sum_{i=1}^{m} H_{\ell_i} \quad (5)$$

by uniformly sampling terms $H_{l_i}$ from the original Hamiltonian.

When one randomly sub-samples the Hamiltonian, errors are naturally introduced. The main question is less about how large such errors are, but rather how they impact the iterative phase estimation protocol. The following lemma states that the impact on the likelihood functions can be made arbitrarily small.

Lemma 2. Let $\ell_j$ be an indexed family of sequences mapping $\{1, \ldots, m\} \to \{1, \ldots, L\}$ formed by uniformly sampling elements from $\{1, \ldots, L\}$ independently with replacement and let $\{H_\ell: \ell=1, \ldots, L\}$ be a corresponding family of Hamiltonians with $H=\sum_{\ell=1}^{L} H_\ell$. For $|\psi\rangle$ an eigenstate of H such that $H|\psi\rangle=E|\psi\rangle$ and $$H_{samp} = \frac{L}{m}\sum_{k=1}^{m} H_{\ell_j(k)}$$

with corresponding eigenstate $H_{samp}|\psi_i\rangle = E_i|\psi_i\rangle$ one then has that the error in the likelihood function for phase estimation vanishes with high probability over $H_{samp}$ in the limit of large m:

$$|P(o|E;t,M,\theta) - P(o|E_i;t,M,\theta)| \in O\left(\frac{MtL}{\sqrt{m}}\sqrt{\mathbb{V}_\ell(\langle\psi|H_\ell|\psi\rangle)}\right)$$

Proof. Because the terms $H_{\ell_i(k)}$ are uniformly sampled, each set of terms $\{\ell_i\}$ is equally likely, and by linearity of expectation $\mathbb{E}[H_{samp}] = H$, from which one knows that $\mathbb{E}_{\{i\}}[\langle\psi|H-H_{est}|\psi\rangle] = 0$.

The second moment is easy to compute from the independence property of the distribution.

$$\mathbb{V}_{\{i\}}(\langle\psi|H_{samp}|\psi\rangle) = \frac{L^2}{m^2}\mathbb{V}_{\{i\}}\left(\langle\psi|\sum_{k=1}^{m} H_{\ell_i(k)}|\psi\rangle\right) = \frac{L^2}{m^2}\sum_{k=1}^{m}\mathbb{V}_{\{i\}}(\langle\psi|H_{\ell_i(k)}|\psi\rangle). \quad (6)$$

Since the different $\ell_i$ are chosen uniformly at random the result then follows from the observation that $\mathbb{V}_{\{i\}}(\langle\psi|H_{\ell_i(k)}|\psi\rangle) = \mathbb{V}_\ell(\langle\psi|H_\ell|\psi\rangle)$.

From first order perturbation theory, one has that the leading order shift in any eigenvalue is $O(\langle\psi|(H-H_{samp})|\psi\rangle)$ to within error $O(L/\sqrt{m})$. Thus the variance in this shift is from Eq. (6)

$$\mathbb{V}_{\{i\}}(\langle\psi|(H-H_{samp})|\psi\rangle) = \frac{L^2}{m}\mathbb{V}_\ell(\langle\psi|H_\ell|\psi\rangle). \quad (7)$$

This further implies that the perturbed eigenstate $|\psi_i\rangle$ has eigenvalue $$H_{samp}|\psi_i\rangle = E|\psi_i\rangle + O\left(\frac{L}{\sqrt{m}}\sqrt{\mathbb{V}_\ell(\langle\psi|H_\ell|\psi\rangle)}\right) \quad (8)$$

with high probability over i from Markov's inequality. It then follows from Taylor's theorem and Eq. (1) that $$|P(o|E;t,M,\theta) - P(o|E_i;t,M,\theta)| \in O\left(\frac{MtL}{\sqrt{m}}\sqrt{\mathbb{V}_\ell(\langle\psi|H_\ell|\psi\rangle)}\right), \quad (9)$$

with high probability over i.

This result shows that if one samples the coefficients of the Hamiltonian that are to be included in the sub-sampled Hamiltonian uniformly then one can make the error in the estimate of the Hamiltonian arbitrarily small. In this context, taking $m \to \infty$ does not cause the cost of simulation to diverge (as it would for many sampling problems). This is because once every possible term is included in the Hamiltonian, there is no point in sub-sampling and one may as well take $H_{samp}$ to be $H$ to eliminate the variance in the likelihood function that would arise from sub-sampling the Hamiltonian. In general, one needs to take $m \in \Omega(\mathbb{V}_\ell(\langle\psi|H_\ell|\psi\rangle)/(MtL)^2)$ in order to guarantee that the error in the likelihood function is at most a constant. Thus, this shows that as any iterative phase estimation algorithm proceeds, that (barring the problem of accidentally exciting a state due to perturbation) one will be able to find a good estimate of the eigenphase by taking m to scale inverse quadratically with M.

IV. Bayesian Phase Estimation Using Random Hamiltonians

Theorem 3. Let E be an event and let $P(E|\theta)$ and $P'(E|\theta)$ for $\theta \in [-\pi, \pi)$ be two likelihood functions such that $\max_\theta(|P(E|\theta) - P'(E|\theta)|) \leq \Delta$ and further assume that for prior $P(\theta)$ one has that $\min(P(E), P'(E)) \geq 2\Delta$. One then has that $$\left|\int \theta(P(\theta|E) - P'(\theta|E))d\theta\right| \leq \frac{5\pi\Delta}{P(E)}.$$

and if $$P(E|\theta) = \prod_{j=1}^{N} P(E_j|\theta) \text{ with } 1 - |P'(E_j|\theta)/P(E_j|\theta)| \leq \gamma \text{ then}$$

$$\left|\int \theta(P(\theta|E) - P'(\theta|E))d\theta\right| \leq 5\pi((1+\gamma)^N - 1).$$

Proof. From the triangle inequality, one has that $$|P(E) - P'(E)| = |\int P(\theta)(P(E|\theta) - P'(E|\theta))d\theta| \leq \Delta. \quad (10)$$

Thus it follows from the assumption that $P'(E) \geq 2\Delta$ that $$|P(\theta|E) - P'(\theta|E)| = P(\theta)\left|\frac{P(E|\theta)}{P(E)} - \frac{P'(E|\theta)}{P'(E)}\right|$$

$$\leq P(\theta)\left(\left|\frac{P(E|\theta)}{P(E)} - \frac{P'(E|\theta)}{P(E)}\right| + \left|\frac{P'(E|\theta)}{P(E)} - \frac{P'(E|\theta)}{P'(E)}\right|\right)$$

$$\leq P(\theta)\left(\frac{\Delta}{P(E)} + \left|\frac{P'(E|\theta)}{P'(E) - \Delta} - \frac{P'(E|\theta)}{P'(E)}\right|\right)$$

$$\leq \Delta\left(\frac{P(\theta)}{P(E)} + \frac{2P'(E|\theta)}{P'^2(E)}\right) \quad (11)$$

Thus one has that $$\left|\int \theta(P(\theta|E) - P'(\theta|E))d\theta\right| \leq \Delta\left(\frac{\langle\theta\rangle_{prior}}{P(E)} + \frac{2\langle\theta\rangle'_{posterior}}{P'(E)}\right), \quad (12)$$

$$\leq \pi\Delta\left(\frac{1}{P(E)} + \frac{2}{P'(E)}\right)$$

$$\leq \pi\Delta\left(\frac{1}{P(E)} + \frac{2}{P(E) - \Delta}\right)$$

$$\leq \frac{5\pi\Delta}{P(E)}.$$

Now if one assumes that one has a likelihood function that factorizes into N experiments, one has that one can take $$\frac{\Delta}{P(E)} = \frac{\prod_{j=1}^{N} P(E_j|\theta) - \prod_{j=1}^{N} P'(E_j|\theta)}{\prod_{j=1}^{N} P(E_j|\theta)} = \prod_{j=1}^{N} 1 - \prod_{j=1}^{N}\frac{P'(E_j|\theta)}{P(E_j|\theta)}. \quad (13)$$

From the triangle inequality $$\prod_{j=1}^{N} 1 - \prod_{j=1}^{N} \frac{P'(E_j \mid \theta)}{P(E_j \mid \theta)} \leq \qquad (14)$$

$$\left| \prod_{j=1}^{N-1} 1 - \prod_{j=1}^{N-1} \frac{P'(E_j \mid \theta)}{P(E_j \mid \theta)} \right| + \left| 1 - \frac{P'(E_N \mid \theta)}{P(E_N \mid \theta)} \right| (1+\gamma)^N \leq$$

$$\left| \prod_{j=1}^{N-1} 1 - \prod_{j=1}^{N-1} \frac{P'(E_j \mid \theta)}{P(E_j \mid \theta)} \right| + \gamma(1+\gamma)^N.$$

Solving this recurrence relation gives $$\prod_{j=1}^{N} 1 - \prod_{j=1}^{N} P'(E_j \mid \theta) P(E_j \mid \theta) \leq (1+\gamma)^N - 1. \qquad (15)$$

Thus the result follows.

V. Shift in the Posterior Mean from Using Random Hamiltonians

In this section, the shift in the posterior mean of the estimated phase is analyzed assuming a random shift $\delta(\phi)$ in the joint likelihood of all the experiments, $$P'(\vec{o} \mid \phi; \vec{M}, \vec{\theta}) = P(\vec{o} \mid \phi; \vec{M}, \vec{\theta}) + \delta(\phi). \qquad (16)$$

Here, $P(\vec{o} \mid \phi; \vec{M}, \vec{\theta})$ is the joint likelihood of a series of N outcomes $\vec{o}$ given a true phase $\phi$ and the experimental parameters $\vec{M}$ and $\vec{\theta}$ for the original Hamiltonian. $P'(\vec{o} \mid \phi; \vec{M}, \vec{\theta})$ is the joint likelihood with a new random Hamiltonian in each experiment. By a vector like $\vec{M}$, the repetitions are meant for each experiment performed in the series; $M_i$ is the number of repetitions in the $i^{th}$ experiment.

First, one can work backwards from the assumption that the joint likelihood is shifted by some amount $\delta(\phi)$, to determine an upper bound on the acceptable difference in ground state energies between the true and the random Hamiltonians. One can do this by working backwards from the shift in the joint likelihood of all experiments, to the shifts in the likelihoods of individual experiments, and finally to the corresponding tolerable differences between the ground state energies. Second, one can use this result to determine the shift in the posterior mean in terms of the differences in energies, as well as its standard deviation over the ensemble of randomly generated Hamiltonians.

A. Shifts in the Joint Likelihood

The random Hamiltonians for each experiment lead to a random shift in the joint likelihood of a series of outcomes $$P'(\vec{o} \mid \phi; \vec{M}, \vec{\theta}) = P(\vec{o} \mid \phi; \vec{M}, \vec{\theta}) + \delta(\phi). \qquad (17)$$

Assume that one would like to determine the maximum possible change in the posterior mean under this shifted likelihood. One can work under the assumption that the mean shift in the likelihood over the prior is at most $|\delta| \leq P(\vec{o})/2$. The posterior is $$P'(\phi \mid \vec{o}; \vec{M}, \vec{\theta}) = \frac{P'(\vec{o} \mid \phi; \vec{M}, \vec{\theta}) P(\phi)}{\int P'(\vec{o} \mid \phi; \vec{M}, \vec{\theta}) P(\phi) d\phi} \qquad (18)$$

$$= \frac{P(\vec{o} \mid \phi; \vec{M}, \vec{\theta}) P(\phi) + \delta(\phi) P(\phi)}{\int (P(\vec{o} \mid \phi; \vec{M}, \vec{\theta}) P(\phi) + \delta(\phi) P(\phi)) d\phi}$$

$$= \frac{P(\vec{o} \mid \phi; \vec{M}, \vec{\theta}) P(\theta) + \delta(\phi) P(\phi)}{P(\vec{o}) + \bar{\delta}}.$$

One can make progress toward bounding the shift in the posterior by first bounding the shift in the joint likelihood in terms of the shifts in the likelihoods of the individual experiments, as follows.

Lemma 4. Let $P(o_j|\phi; M_j, \theta_j)$ be the likelihood of outcome $o_j$ on the $j^{th}$ experiment for the Hamiltonian H, and $P'(o_j|\phi; M_j, \theta_j) = P(o_j|\phi; M_j, \theta_j) + \epsilon_j(\phi)$ be the likelihood with the randomly generated Hamiltonian $H_j$. Assume that $N \max_j (|\epsilon_j(\phi)|/P(o_j|\phi, M_j, \theta_j)) < 1$ and $|\epsilon_j(\phi)| \leq P(o_j|\phi, M_j, \theta_j)/2$ for all experiments j. Then the mean shift in the joint likelihood of all N experiments, $$|\bar{\delta}| = |\int P(\phi)(P'(\vec{o}|\phi; \vec{M}, \vec{\theta}) - P(\vec{o}|\phi; \vec{M}, \vec{\theta})) d\phi|,$$

is at most $$|\bar{\delta}| \leq 2 \sum_{j=1}^{N} \max_{\phi} \frac{|\epsilon_j(\phi)|}{P(o_j \mid \phi; M_j, \theta_j)} P(\vec{o}).$$

Proof. One can write the joint likelihood in terms of the shift $\epsilon_j(\phi)$ to the likelihoods of each of the N experiments in the sequence, $P'(o_j|\phi; M_j, \theta_j) = P(o_j|\phi; M_j, \theta_j) + \epsilon_j(\phi)$. The joint likelihood is $P'(\vec{o}|\phi; \vec{M}, \vec{\theta}) = \prod_{j=1}^{N} (P(o_j|\phi; M_j, \theta_j) + \epsilon_j(\phi))$, so $$\log P'(\vec{o} \mid \phi; \vec{M}, \vec{\theta}) = \log \left( \prod_{j=1}^{N} (P(o_j \mid \phi; M_j, \theta_j) + \epsilon_j(\phi)) \right) \qquad (19)$$

$$= \sum_{j=1}^{N} \log P(o_j \mid \phi, M_j, \theta_j) +$$

$$\log \left( 1 + \frac{\epsilon_j(\phi)}{P(o_j \mid \phi, M_j, \theta_j)} \right)$$

$$= \log P(\vec{o} \mid \phi; \vec{M}, \vec{\theta}) +$$

$$\sum_{j=1}^{N} \log \left( 1 + \frac{\epsilon_j(\phi)}{P(o_j \mid \phi, M_j, \theta_j)} \right)$$

This gives one the ratio of the shifted to the unshifted joint likelihood, $$\frac{P'(\vec{o} \mid \phi; \vec{M}, \vec{\theta})}{P(\vec{o} \mid \phi; \vec{M}, \vec{\theta})} = \exp \left[ \sum_{j=1}^{N} \log \left( 1 + \frac{\epsilon_j(\phi)}{P(o_j \mid \phi, M_j, \theta_j)} \right) \right]. \qquad (20)$$

One can then, for example, linearize and simplify this using inequalities for the logarithm and exponential. By finding inequalities which either upper or lower bound both these functions, one can upper bound on $|\delta(\phi)|$ in terms of the unshifted likelihoods $P(\vec{o}|\phi; \vec{M}, \vec{\theta})$ and $P(o_j|\phi; M_j, \theta_j)$, and the shift in the single-experiment likelihood $\epsilon_j(\phi)$.

The inequalities that one can use to sandwich the ratio are $$1-|x| \leq \exp(x), \text{ for } x \leq 0 \quad (21)$$

$$\exp(x) \leq 1+2|x|, \text{ for } x<1$$

$$-2|x| \leq \log(1+x), \text{ for } |x| \leq 1/2$$

$$\log(1+x) \leq |x|, \text{ for } x \in \mathbb{R}$$

In order for all four inequalities to hold, one must have that $N \max_j(|\epsilon_j(\phi)|/P(o_j|\phi, M_j, \theta_j))<1$ (for the exponential inequalities) and $|\epsilon_j(\phi)| \leq P(o_j|\phi, M_j, \theta_j)/2$ for all $j$ (for the logarithm inequalities). Using them to upper bound the ratio of the shifted to the unshifted likelihood, $$\frac{P'(\vec{o}|\phi;\vec{M},\vec{\theta})}{P(\vec{o}|\phi;\vec{M},\vec{\theta})} = \frac{P(\vec{o}|\phi;\vec{M},\vec{\theta}) + \delta(\phi)}{P(\vec{o}|\phi;\vec{M},\vec{\theta})} \leq \quad (22)$$

$$\exp\left[\sum_{j=1}^{N} \frac{|\epsilon_j(\phi)|}{P(o_j|\phi, M_j, \theta_j)}\right] \leq 1 + 2\sum_{j=1}^{N} \frac{|\epsilon_j(\phi)|}{P(o_j|\phi, M_j, \theta_j)};$$

$$\delta(\phi) \leq 2P(\vec{o}|\phi;\vec{M},\vec{\theta})\sum_{j=1}^{N} \frac{|\epsilon_j(\phi)|}{P(o_j|\phi, M_j, \theta_j)}.$$

On the other hand, using them to lower bound the ratio, $$\frac{P'(\vec{o}|\phi;\vec{M},\vec{\theta})}{P(\vec{o}|\phi;\vec{M},\vec{\theta})} = \frac{P(\vec{o}|\phi;\vec{M},\vec{\theta}) + \delta(\phi)}{P(\vec{o}|\phi;\vec{M},\vec{\theta})} \geq \quad (23)$$

$$\exp\left[-2\sum_{j=1}^{N} \frac{|\epsilon_j(\phi)|}{P(o_j;\phi;M_j,\theta_j)}\right] \geq 1 - 2\sum_{j=1}^{N} \frac{|\epsilon_j(\phi)|}{P(o_j;\phi;M_j,\theta_j)};$$

$$\delta(\phi) \geq -2P(\vec{o}|\phi;\vec{M},\vec{\theta})\sum_{j=1}^{N} \frac{|\epsilon_j(\phi)|}{P(o_j;\phi;M_j,\theta_j)}.$$

The upper and lower bounds are identical up to sign. This allows one to combine them directly, so one has $$|\delta(\phi)| \leq 2P(\vec{o}|\phi;\vec{M},\vec{\theta})\sum_{j=1}^{N} \frac{|\epsilon_j(\phi)|}{P(o_j;\phi;M_j,\theta_j)}. \quad (24)$$

From this, one can find an upper bound on the mean shift over the posterior, $|\vec{\delta}|$, since by the triangle inequality $$|\vec{\delta}| = \left|\int \delta(\phi)P(\phi)d\phi\right| \leq \quad (25)$$

$$2\sum_{j=1}^{N} \int \left(\frac{|\epsilon_j(\phi)|}{P(o_j;\phi;M_j,\theta_j)}P(\vec{o}|\phi;\vec{M},\vec{\theta})P(\phi)\right)d\phi \leq$$

$$2\sum_{j=1}^{N} \max_\phi \frac{|\epsilon_j(\phi)|}{P(o_j|\phi;M_j,\theta_j)}P(\vec{o}).$$

So one has a bound on the shift in the joint likelihood in terms of the shifts in the likelihoods of individual experiments. These results allow one to bound the shift in the posterior mean in terms of the shifts in the likelihoods of the individual experiments $\epsilon_j(\phi)$.

B. Shift in the Posterior Mean

One can use the assumption that $|\vec{\delta}| \leq P(\vec{o})/2$ to bound the shift in the posterior mean.

Lemma 5. Assuming in addition to the assumptions of Lemma 4 that $|\vec{\delta}| \leq P(\vec{o})/2$, the difference between the posterior mean that one would see with the ideal likelihood function and the perturbed likelihood function is at most $$|\bar{\phi} - \bar{\phi}'| \leq 8\max_\phi \left(\sum_{j=1}^{N} \frac{|\epsilon_j(\phi)|}{P(o_j|\phi, M_j, \theta_j)}\right)|\bar{\phi}|^{post}.$$

Proof. One can approach the problem of bounding the difference between the posterior means by bounding the point-wise difference between the shifted posterior and the posterior with the original Hamiltonian, $$\left|P(\phi|\vec{o};\vec{M},\vec{\theta}) - P'(\phi|\vec{o};\vec{M},\vec{\theta})\right| = \quad (26)$$

$$\left|\frac{P(\vec{o}|\phi;\vec{M},\vec{\theta})P(\phi)}{P(\vec{o})} - \frac{P(\vec{o}|\phi;\vec{M},\vec{\theta})P(\phi) + \delta(\phi)P(\phi)}{P(\vec{o}) + \vec{\delta}}\right|.$$

As a first step, one can place an upper bound on the denominator of the shifted posterior, $$(P(\vec{o}) + \vec{\delta}): \quad (27)$$

$$\frac{1}{P(\vec{o}) + \vec{\delta}} = \frac{1}{P(\vec{o})}\sum_{k=0}^{\infty}\left(\frac{-\vec{\delta}}{P(\vec{o})}\right)^k$$

$$= \frac{1}{P(\vec{o})} - \frac{\vec{\delta}}{P(\vec{o})^2} + \frac{\vec{\delta}^2}{P(\vec{o})^3}\sum_{k=0}^{\infty}\left(\frac{-\vec{\delta}}{P(\vec{o})}\right)^k$$

$$\leq \frac{1}{P(\vec{o})} + \frac{2|\vec{\delta}|}{P(\vec{o})^2} = \frac{1 + 2|\vec{\delta}|/P(\vec{o})}{P(\vec{o})},$$

where in the two inequalities the assumption that $|\vec{\delta}| \leq P(\vec{o})/2$ was used. Using this, the point-wise difference between the posteriors is at most $$\left|\frac{P(\vec{o}|\phi;\vec{M},\vec{\theta})P(\phi)}{P(\vec{o})} - \frac{P(\vec{o}|\phi;\vec{M},\vec{\theta})P(\phi) + \delta(\phi)P(\phi)}{P(\vec{o}) + \vec{\delta}}\right| \leq \quad (28)$$

$$\left|\frac{P(\vec{o}|\phi;\vec{M},\vec{\theta})P(\phi)}{P(\vec{o})} - \frac{P(\vec{o}|\phi;\vec{M},\vec{\theta})P(\phi)}{P(\vec{o}) + \vec{\delta}}\right| + \left|\frac{\delta(\phi)P(\phi)}{P(\vec{o}) + \vec{\delta}}\right| \leq$$

$$\frac{2|\vec{\delta}|P(\vec{o}|\phi;\vec{M},\vec{\theta})P(\phi)}{P(\vec{o})^2} + \frac{|\delta(\phi)|P(\phi)}{P(\vec{o})}\left(1 + \frac{2|\vec{\delta}|}{P(\vec{o})}\right) \leq$$

$$\frac{2|\vec{\delta}|P(\vec{o}|\phi;\vec{M},\vec{\theta})P(\phi)}{P(\vec{o})^2} + \frac{2|\delta(\phi)|P(\phi)}{P(\vec{o})},$$

again using $|\vec{\delta}| \leq P(\vec{o})/2$. With this, one can bound the change in the posterior mean, $$|\bar{\phi} - \bar{\phi}'| \leq \int |\phi| \left| P(\phi \mid \vec{o}; \vec{M}, \vec{\theta}) - P'(\phi \mid \vec{o}; \vec{M}, \vec{\theta}) \right| d\phi \qquad (29)$$

$$\leq \frac{2}{P(\vec{o})} \int |\phi| \left( \frac{|\vec{\delta}| P(\vec{o} \mid \phi; \vec{M}, \vec{\theta}) P(\phi)}{P(\vec{o})} + |\delta(\phi)| P(\phi) \right) d\phi$$

$$\leq \frac{2}{P(\vec{o})} \int |\phi| |\delta(\phi)| P(\phi) d\phi + \frac{2|\vec{\delta}|}{P(\vec{o})} \int |\phi| \left( \frac{P(\vec{o} \mid \phi; \vec{M}, \vec{\theta}) P(\phi)}{P(\vec{o})} \right) d\phi$$

$$\leq \frac{2}{P(\vec{o})} \left( \int |\phi| |\delta(\phi)| P(\phi) d\phi + |\bar{\phi}|^{post} |\vec{\delta}| \right)$$

Now, the bounds from Lemma 4 allow one to bound the shift on the posterior mean in terms of the shifts in the likelihoods of individual experiments, $\epsilon_j(\phi)$, $$|\bar{\phi} - \bar{\phi}'| \leq \frac{2}{P(\vec{o})} \left( \int |\phi| |\delta(\phi)| P(\phi) d\phi + |\bar{\phi}|^{post} |\vec{\delta}| \right) \leq \qquad (30)$$

$$\frac{2}{P(\vec{o})} \left( 2 \max_\phi \sum_{j=1}^{N} \frac{|\epsilon_j(\phi)|}{P(o_j \mid \phi, M_j, \theta_j)} P(\vec{o}) \right.$$

$$\left. \int |\phi| \left( \frac{P(\vec{o} \mid \phi; \vec{M}, \vec{\theta}) P(\phi)}{P(\vec{o})} \right) d\phi + |\bar{\phi}|^{post} |\vec{\delta}| \right),$$

where in the last step, one can multiple and divide by $P(\vec{o})$. This is $$|\bar{\phi} - \bar{\phi}'| \leq \frac{2}{P(\vec{o})} \left( 2 \max_\phi \left( \sum_{j=1}^{N} \frac{|\epsilon_j(\phi)|}{P(o_j \mid \phi, M_j, \theta_j)} \right) P(\vec{o}) |\bar{\phi}|^{post} + |\bar{\phi}|^{post} |\vec{\delta}| \right) \qquad (31)$$

$$\leq 8 \max_\phi \left( \sum_{j=1}^{N} \frac{|\epsilon_j(\phi)|}{P(o_j \mid \phi, M_j, \theta_j)} \right) |\bar{\phi}|^{post}.$$

C. Acceptable Shifts in the Phase

A further question is what the bound on the shift in the posterior mean is in terms of shifts in the phase.

Theorem 6. If the assumptions of Lemma 5, for all j and x $$\in [-\pi, \pi) P(o_j \mid \theta; x, \theta_j) = \frac{1 + (-1)^{o_j} \cos(M_j(\theta_j - x))}{2},$$

for each of the N experiments, one has that the eigenphases used in PE $\{\phi'_j = 1, \ldots N\}$ and the eigenphase the true Hamiltonian $\phi$ obey $|\phi - \phi'_j| \leq \Delta \phi$ and additionally $P(o_j | \phi, M_j, \theta_j) \in \Theta(1)$ then one has that the shift in the posterior mean of the eigenphase that arises from inaccuracies in the eigenvalues in the intervening Hamiltonians obeys $$|\bar{\phi} - \bar{\phi}'| \leq 8 \max_\phi \left( \sum_{j=1}^{N} \frac{M_j}{P(o_j \mid \phi; M_j, \theta_j)} \right) |\Delta \phi|.$$

Furthermore if $\Sigma_j M_j \in O(1/\epsilon_\phi)$ and $P(o_j|\phi; M_j, \theta_j) \in \Theta(1)$ for all j then $$|\bar{\phi} - \bar{\phi}'| \in O\left(\frac{|\Delta \phi|}{\epsilon_\phi}\right)$$

Proof. One can express the shift in the posterior mean in terms of the shift in the phase applied to the ground state, $\Delta \phi$, by bounding $\epsilon_j(\phi)$ in terms of it. Recall that the likelihood with the random Hamiltonian is $$P'(o_j|\phi; M_j, \theta_j) = P(o_j|\phi; M_j, \theta_j) + \epsilon_j(\phi), \qquad (32)$$

where the unshifted likelihood for the $j^{th}$ experiment is $P(o_j|\phi; M_j, \theta_j) = \frac{1}{2}(1 + (-1)^{o_j} \cos(M_j(\phi - \theta_j)))$. Thus, $$|\epsilon_j(\phi)| = \frac{1}{2} |\cos(M_j(\phi + \Delta \phi - \theta_j)) - \cos(M_j(\phi - \theta_j))| \leq M_j |\Delta \phi|, \qquad (33)$$

using the upper bound on the derivative $\sin(x) \leq |x|$. In sum, one has that the error in the posterior mean in the posterior mean is at most $$|\bar{\phi} - \bar{\phi}'| \leq 8 \max_\phi \left( \sum_{j=1}^{N} \frac{M_j}{P(o_j \mid \phi, M_j, \theta_j)} \right) |\bar{\phi}|^{post} |\Delta \phi|. \qquad (34)$$

The result then follows from the fact that the absolute value of the posterior mean is at most $\pi$ if the branch $[-\pi, \pi)$ is chosen.

VI. Shift in the Eigenphase with a New Random Hamiltonian in Each Repetition One can reduce the variance in the applied phase by generating a different Hamiltonian in each repetition. However, this is not without its costs: it can be viewed either as leading to a failure probability in the evolution or more generally to an additional phase shift.

The reason this reduces the variance is somewhat complex to formalize mathematically—it comes in when you compute the variance of $|\Delta \phi|$. Instead of just having the indices for a single Hamiltonian, the variance is over the indices of $M_j$ Hamiltonians. Because of this, it only scales as $M \, \mathbb{V} \, o \phi_{est}]$ instead of $M^2 \, \mathbb{V} \, [\phi_{est}]$ as it usually would (there is an underlying variance in $\phi_{est}$). The cost is that, by reducing the variance in the phase in this way, one causes an additional shift in the phase. If one did not do this across multiple steps, one would be adiabatic all the way with the same wrong Hamiltonian. Instead, this means that one is only approximately adiabatic at the cost of the variance being lower by a factor $M_j$. Since the additional shift is also linear in $[M_j]$, this can lead to an improvement. It generally requires that the gap be small, and that $\lambda_j \propto \|H_j - H_{j-1}\|$ be small.

One then has a competition between the standard deviation being $M_j \sqrt{\mathbb{V}} \, [\phi_{est}]$ or $\sqrt{M_j} \sqrt{\mathbb{V}} \, [\phi_{est}]$, and this new shift which is linear in $M_j$. So depending on the gap, it might be hard to get a rigorous bound showing that this is better, and that one should not just stick with the higher variance from a single Hamiltonian.

A. Failure Probability of the Algorithm

For phase estimation, one can reduce the variance of the estimate in the phase by randomizing within the repetitions for each experiment. For the $j^{th}$ experiment with $M_j$ repetitions (recall that $M_j$ is not necessarily an integer), one divides into $[M_j]$ repetitions.

Within each repetition, one can randomly generate a new Hamiltonian $H_k$. Each Hamiltonian $H_k$ has a slightly different ground state and energy than all the others.

The reason this reduces the variance in the estimated phase is that the phases between repetitions are uncorrelated whereas for the single-Hamiltonian case, the variance in the phase $\exp(-iM\phi_{est})$ is $\mathbb{V}[M\phi_{est}]=M^2\mathbb{V}[\phi_{est}]$, when one simulates a different random Hamiltonian in each repetition (and estimate the sum of the phases, as $\exp(-i\Sigma_{k=1}^M \phi_{k,est}))$, the variance is $\mathbb{V}[\Sigma_{k=1}^M \phi_{k,est}]=\Sigma_{k=1}^M \mathbb{V}[\phi_{k,est}]$.

By evolving under a different random instantiation of the Hamiltonian in each repetition, the variance in the phase is quadratically reduced; the only cost is that the algorithm now has either a failure probability (of leaving the ground state from repetition to repetition, e.g. in the transition from the ground state of $H_{k-1}$ to the ground state of $H_k$) or an additional phase shift compared to the true sum of the ground state energies. The first case is simpler to analyze: it is shown in Lemma 7, provided that the gap is sufficiently small, that the failure probability can be made arbitrarily small. One can do this by viewing the success probability of the algorithm as the probability of remaining in the ground state throughout the sequence of $[M_j]$ random Hamiltonians. In the second case, one can prove in Lemma 8 a bound on the difference between eigenvalues if the state only leaves the ground space for short intervals during the evolution.

Lemma 7. Consider a sequence of Hamiltonians $\{H_k\}_{k=1}^M$, $M>1$. Let $\gamma$ be the minimum gap between the ground and first excited energies of any of the Hamiltonians, $\gamma = \min_k (E_1^k - E_0^k)$. Similarly, let $\lambda = \max_k \|H_k - H_{k-1}\|$ be the maximum difference between any two in the sequence. The probability of leaving the ground state when transferring from $H_i$ to $H_2$ through to $H_M$ in order is at most $0 < \epsilon < 1$ provided that $$\frac{\lambda}{\gamma} < \sqrt{1 - \exp\left(\frac{\log(1-c)}{M-1}\right)}.$$

Proof. Let $|\psi_i^k\rangle$ be the $i^{th}$ eigenstate of the Hamiltonian $H_k$ and let $E_i^k$ be the corresponding energy. Given that the algorithm begins in the ground state of $H_1$ ($|\psi_0^1\rangle$), the probability of remaining in the ground state through all M steps is $$|\langle\psi_0^M|\psi_0^{M-1}\rangle \ldots \langle\psi_0^2|\psi_0^1\rangle|^2. \quad (35)$$

This is the probability of the algorithm staying in the ground state in every segment. One can simplify this expression by finding a bound for $\||\psi_0^k\rangle - |\psi_0^{k-1}\rangle\|^2$. Let $\lambda_k V_k = H_k - H_{k-1}$, where one can choose $\lambda_k$ such that $\|V_k\|=1$ to simplify the proof. Treating $\lambda_k V_k$ as a perturbation on $H_{k-1}$, the components of the shift in the ground state of $H_{k-1}$ are bounded by the derivative $$\left|\frac{\partial}{\partial \lambda}\langle\psi_0^{k-1}|\psi_\ell^k\rangle\right| = \frac{|\langle\psi_\ell^{k-1}|V_k|\psi_0^{k-1}\rangle|}{E_\ell^{k-1} - E_0^{k-1}} \quad (36)$$

multiplied by $\lambda = \max |\lambda_k|$, where the maximization is over both k as well as perturbations for a given k. Using this, $$|\langle\psi_\ell^k|\psi_0^{k-1}\rangle|^2 \leq \lambda^2 \frac{|\langle\psi_\ell^{k-1}|V_k|\psi_0^{k-1}\rangle|^2}{(E_\ell^{k-1}-E_0^{k-1})^2} \leq \lambda^2 \frac{|\langle\psi_\ell^{k-1}|V_k|\psi_0^{k-1}\rangle|^2}{\gamma^2}. \quad (37)$$

This allows one to write $|\psi_0^{k+1}\rangle = (1+\delta_0)|\psi_0^k\rangle + \sum_{\ell\neq 0}\delta_\ell|\psi_\ell^k\rangle$, where $|\delta_\ell| \leq \lambda \max_k$ $$\frac{|\langle\psi_\ell^k|V_k|\psi_0^k\rangle|}{E_0^k - E_\ell^k}.$$

Letting $V_k|\psi_0^k\rangle = \kappa_k|\phi_k\rangle$, where one can again choose $\kappa_k$ such that $|\phi_k\rangle$ is normalized, $$\||\psi_0^k\rangle - |\psi_0^{k-1}\rangle\|^2 = \delta_0^2 + \sum_{\ell>0}\delta_\ell^2 \leq \delta_0^2 + \frac{\lambda^2}{\gamma^2}\sum_\ell |\langle\psi_\ell^{k-1}|V_k|\psi_0^{k-1}\rangle|^2 \quad (38)$$

$$= \delta_0^2 + \frac{\lambda^2}{\gamma^2}\kappa_k^2 \sum_\ell |\langle\psi_\ell^k|\phi_k\rangle|^2$$

$$= \delta_0^2 + \frac{\lambda^2}{\gamma^2}\kappa_k^2.$$

One can solve for $\delta_0^2$ in terms of $\sum_{\ell>0}\delta_\ell^2$ since $(1+\delta_0)^2 + \sum_{\ell>0}\delta_\ell^2 = 1$. Since $\sqrt{1-x} \geq 1-x$ for $x \in [0,1]$, $$\delta_0^2 = \left(1 - \sqrt{1 - \sum_{\ell>0}\delta_\ell^2}\right)^2 \leq \left(\sum_{\ell>0}\delta_\ell^2\right)^2 \leq \sum_{\ell>0}\delta_\ell^2 \quad (39)$$

since $\sum_{\ell>0}\delta_\ell^2 \leq 1$. Finally, returning to $\||\psi_0^k\rangle - |\psi_0^{k-1}\rangle\|^2$, since $\kappa_k \leq 1$ (this is true because $\|V_k\|=1$), the difference between the ground states of the two Hamiltonians is at most $$\||\psi_0^k\rangle - |\psi_0^{k-1}\rangle\|^2 \leq \frac{2\lambda^2}{\gamma^2} \quad (40)$$

This means that the overlap probability between the ground states of any two adjacent Hamiltonians is $$|\langle\psi_0^{k+1}|\psi_0^k\rangle|^2 \geq 1 - \frac{\lambda^2}{\gamma^2}.$$

Across M segments (M−1 transitions), the success probability is at least $$\left(1 - \frac{\lambda^2}{\gamma^2}\right)^{M-1}.$$

If one wishes for the failure probability to be at most some fixed $0 < \epsilon < 1$, one must have $$\left(1 - \frac{\lambda^2}{\gamma^2}\right)^{M-1} > 1 - \epsilon \quad (41)$$

$$\frac{\lambda}{\gamma} < \sqrt{1 - \exp\left(\frac{\log(1-\epsilon)}{M-1}\right)}.$$

If one can only prepare the ground state $|\psi_0\rangle$ of the original Hamiltonian, the success probability has an additional factor $|\langle \psi_0^1|\psi_0\rangle|^2$. In this case, one can apply Lemma 7 with $\|H-H_1\|$ included in the maximization for $\lambda$. Further, since $\gamma = \min_k(E_1^k - E_0^k) \leq E_1 - E_0 - 2\lambda|\langle \psi_0|H_k - H|\psi_0\rangle| \leq E_1 - E_0 - 2\lambda$, where $E_1 - E_0$ is the gap between the ground and first excited states of H, one needs $$\frac{\lambda}{E_1 - E_0 - 2\lambda} < \sqrt{1 - \exp\left(\frac{\log(1-\epsilon)}{M}\right)}. \quad (42)$$

Provided that this occurs, one stays in the ground state of each Hamiltonian throughout the simulation with probability $1-\epsilon$. In this case, the total accumulated phase is $$\frac{\langle \psi_0^{[M_j]}|e^{-iH_{[M_j]}\Delta t}|\psi_0^{[M_j]-1}\rangle \ldots \langle \psi_0^2|e^{-iH_2\Delta t}|\psi_0^1\rangle \langle \psi_0^1|e^{-iH_1\Delta t}|\psi_0\rangle}{\langle \psi_0^{[M_j]}|\psi_0^{[M_j]-1}\rangle \ldots \langle \psi_0^2|\psi_0^1\rangle \langle \psi_0^1|\psi_0\rangle} = \exp\left(-i\sum_{k=1}^{[M_j]} E_k^0 \Delta t\right), \quad (43)$$

where $\Delta t = M_j t/\lceil M_j \rceil$.

B. Phase Shifts Due to Hamiltonian Errors

One can generalize the analysis of the difference in the phase by determining the difference between the desired (adiabatic) unitary and the true one. Evolving under M random Hamiltonians in sequence, the unitary applied for each new Hamiltonian $H_k$ is $$U_k = \exp(-iH_k\Delta t) = \sum_\ell |\psi_\ell^k\rangle\langle\psi_\ell^k|e^{-iE_\ell^k\Delta t}, \quad (44)$$

while the adiabatic unitary one would ideally apply is $$U_{k,ad} = \sum_\ell |\psi_\ell^{k+1}\rangle\langle\psi_\ell^k|e^{-iE_\ell^k\Delta t}. \quad (45)$$

The difference between the two is that true time evolution $U_k$ under $H_k$ applies phases to the eigenstates of $H_k$, while the adiabatic unitary $U_{k,ad}$ applies the eigenphase, and then maps each eigenstate of $H_k$ to the corresponding eigenstate of $H_{k+1}$. This means that if the system begins in the ground state of $H_1$, the phase which will be applied to it by the sequence $(U_{[M_j],ad}U_{[M_j]-1,ad} \ldots U_{2,ad}U_{1,ad}$ is proportional to the sum of the ground state energies of each Hamiltonian in that sequence. By comparison, $U_{[M_j]}U_{[M_j]-1} \ldots U_2U_1$ will include contributions from many different eigenstates of the different Hamiltonians $H_k$.

One can bound the difference between the unitaries $U_k$ and $U_{k,ad}$ as follows.

Lemma 8. Let $P_0^k$ be the projector onto the ground state of $H_k$, $|\psi_0^k\rangle$, and let the assumptions of Lemma 7 hold. The difference between the eigenvalues of $$U_k P_0^k = \exp(-iH_k\Delta t)P_0^k = \sum_\ell |\psi_\ell^k\rangle\langle\psi_\ell^k|e^{-iE_\ell^k\Delta t}P_0^k \text{ and}$$

$$U_{k,ad} P_0^k = |\psi_0^{k+1}\rangle\langle\psi_0^k|e^{-iE_0^k\Delta t}P_0^k,$$

where $\Delta t$ is the simulation time, is at most $$\|(U_k - U_{k,ad})P_0^k\| \leq \frac{2\lambda^2}{(\gamma - 2\lambda)^2}.$$

Proof. First, one can expand the true unitary using the resolution of the identity $\Sigma_p|\psi_p^{k+1}\rangle\langle\psi_p^{k+1}|$, the eigenstates of the next Hamiltonian, $H_{k+1}$:

$$U_k = \sum_{p,\ell} |\psi_p^{k+1}\rangle\langle\psi_p^{k+1}|\psi_\ell^k\rangle\langle\psi_\ell^k|e^{-iE_\ell^k\Delta t}. \quad (46)$$

Let $\Delta_{p\ell} = \langle \psi_p^{k+1}|\psi_\ell^k\rangle$ for $p \neq \ell$ and $1 + \Delta_{pp} = \langle_p^{k+1}|\psi_p^k\rangle$ when $p = \ell$. In a sense, one is writing the new eigenstate $|\psi_p^{k+1}\rangle$ as a slight shift from the state $|\psi_\ell^k\rangle$: this e reason that one chooses $\langle \psi_p^{k+1}|\psi_p^k\rangle = 1 + \Delta_{pp}$. Using this definition, one can continue to simplify $U_k$, as $$U_k = \sum_p (1+\Delta_{pp})|\psi_p^{k+1}\rangle\langle\psi_p^k|e^{-iE_p^k\Delta t} + \sum_{p\neq\ell} \Delta_{p\ell}|\psi_p^{k+1}\rangle\langle\psi_\ell^k|e^{-iE_\ell^k\Delta t}. \quad (47)$$

One is now well-positioned to bound $\|(U_k - U_{k,ad})P_0^k\|$. Noting that $U_{k,ad}$ exactly equals the 1 in the first sum in $U_k$.

$$\|(U_k - U_{k,ad})P_0^k\| = \left\|\sum_p \Delta_{p\ell}|\psi_p^{k+1}\rangle\langle\psi_\ell^k|e^{-iE_\ell^k\Delta t}|\psi_0^k\rangle\langle\psi_0^k|\right\| = \max_{|\psi\rangle}\left|\sum_{p\ell} \Delta_{p\ell}|\psi_p^{k+1}\rangle\langle\psi_\ell^k|e^{-iE_\ell^k\Delta t}|\psi_0^k\rangle\langle\psi_0^k|\psi\rangle\right|^2 = \quad (48)$$

$$\left|\sum_p \Delta_{p0}e^{-iE_0^k\Delta t}\right|^2 \leq \sum_p |\Delta_{p0}|^2.$$

The final step in bounding $\|U_k - U_{k,ad}\|$ is to bound $|\Delta_{p\ell}| = \langle \psi_p^{k+1}|\psi_\ell^k\rangle$ similarly to how one bounded $\delta_{p\ell}$. For $p \neq \ell$, $\Delta_{p\ell}$ is given by $$|\Delta_{p\ell}|^2 = |\langle\psi_p^{k+1}|\psi_\ell^k\rangle|^2 \leq \lambda^2 \frac{|\langle\psi_p^k|V_k|\psi_\ell^k\rangle|^2}{(E_p^k - E_\ell^k)^2}. \quad (49)$$

So, as with the bounds on $|\delta_0|^2$ and $\Sigma_{l>0}|\delta_l|^2$ in Lemma 7, $\|(U_k - U_{k,ad})P_0^k\|$ is upper bounded by $$\sum_p |\Delta_{p0}|^2 = \sum_p |\langle\psi_p^{k+1}|\psi_0^k\rangle|^2 \leq \sum_p \lambda^2 \frac{|\langle\psi_p^k|V_k|\psi_0^k\rangle|^2}{(E_p^k - E_0^k)^2} \leq \frac{2\lambda^2}{(\gamma - 2\lambda)^2}, \quad (50)$$

which completes the proof.

Theorem 9. Consider a sequence of Hamiltonians $\{H_k\}_{k=1}^M$, $M>1$. Let $\gamma$ be the minimum gap between the ground and first excited energies of any of the Hamiltonians, $\gamma=\min_k (E_1^k - E_0^k)$. Similarly, let $\lambda = \max_k \|H_k - H_{k-1}\|$ be the maximum difference between any two Hamiltonians in the sequence. The maximum error in the estimated eigenphases of the unitary found by the products of these M Hamiltonians is at most $$|\phi_{est} - \phi_{true}| \le \frac{2M\lambda^2}{(\gamma - 2\lambda)^2},$$

with a probability of failure of at most e provided that $$\frac{\lambda}{\gamma} < \sqrt{1 - \exp\left(\frac{\log(1-\epsilon)}{M-1}\right)}.$$

Proof. Lemma 8 gives the difference between eigenvalues of $U_k P_0^k$ and $U_{k,ad} P_0^k$. Across the entire sequence, one has $$\|U_M P_0^M \ldots U_k P_0^k \ldots U_1 P_0^1 - U_{M,ad} P_0^M \ldots U_{k,ad} P_0^k \ldots U_{1,ad} P_0^1\| \le \quad (51)$$

$$\frac{2M\lambda^2}{(\gamma - 2\lambda)^2}.$$

This is the maximum possible difference between the accumulated phases for the ideal and actual sequences, assuming the system leaves the ground state for at most one repetition at a time.

The probability of leaving the groundstate as part of a Landau-Zener process instigated by the measurement at adjacent values of the Hamiltonians is, under the assumptions of Lemma 7, that the failure probability occurring at each projection is $\epsilon$ if $$\frac{\lambda}{\gamma} < \sqrt{1 - \exp\left(\frac{\log(1-\epsilon)}{M-1}\right)}, \quad (52)$$

thus the result follows trivially from these two results.

VII. Importance Sampling

The fundamental idea behind the example approach to decimation of a Hamiltonian is importance sampling. This approach has already seen great use in coalescing, but one can use it slightly differently here. The idea behind importance sampling is to reduce the variance of the mean of a quantity by reweighting the sum. Specifically, one can write the mean of N numbers F(j) as $$\frac{1}{N}\sum_j F(j) = \sum_j f(j) \frac{F(j)}{Nf(j)}, \quad (53)$$

where $f(j)$ is the importance of a given term. This shows that one can view the initial unweighted average as the average of a reweighted quantity $x_j/(f(j)N)$. While this does not have an impact on the mean of $x_j$ it can dramatically reduce the sample variance of the mean and thus is widely used in statistics to provide more accurate estimates of means. The optimal importance function to take in these cases is $f(j) \propto |x_j|$. In such cases, it is straightforward to see that the variance of the resulting distribution is in fact zero if the sign of the $x_j$ is constant. In such cases a straight forward calculation shows that this optimal variance is $$\mathbb{V}_{f_{opt}} = (\mathbb{E}(|F|))^2 - (\mathbb{E}(F))^2 \quad (54)$$

The optimal variance in (54) is in fact zero if the sign of the numbers is constant. While this may seem surprising, it becomes less mysterious when one notes that in order to compute the optimal importance function you need the ensemble mean that you would like to estimate. This would defeat the purpose of importance sampling in most cases. Thus if one wants to glean an advantage from importance sampling for Hamiltonian simulation then it is important to show that one can use it even with an inexact importance function that can be, for example, computed efficiently using a classical computer.

It is now shown how this robustness holds below.

Lemma 10. Let $F: \mathbb{Z}_N \mapsto \mathbb{R}$ with $\mathbb{E}(F) = N^{-1}\sum_{j=0}^{N-1} F(j)$ be an unknown probability distribution that can be sampled from and let $\tilde{F}: \mathbb{Z}_N \mapsto \mathbb{R}$ be a known function such that for all j, $|\tilde{F}(j)| - |F(j)| = \delta_j$ with $|\delta_j| \le |F(j)|/2$. If importance sampling is used with an importance function $f(j) = |\tilde{F}(j)|/\Sigma_k |\tilde{F}(k)|$ then the variance obeys $$\mathbb{V}_f(F) = \frac{1}{N^2}\sum_j f(j)\left(\frac{F(j)}{Nf(j)}\right)^2 - (\mathbb{E}(F))^2 \le$$

$$\frac{4}{N^2}\left(\sum_k |\delta_k|\right)\left(\sum_j |F(j)|\right) + \mathbb{V}_{f_{opt}}(F)$$

Proof. The proof is a straight forward exercise in the triangle inequality once one uses the fact that $|\delta_j| \le |F(j)|/2$ and the fact that $1/(1-|x|) \le 1+2|x|$ for all $x \in [-\frac{1}{2}, \frac{1}{2}]$:

$$\mathbb{V}_f(F) = \frac{1}{N^2}\left(\sum_k |F(k)| + \delta_k\right)\left(\sum_j \frac{F^2(j)}{|F(j)| + \delta_j}\right) - (\mathbb{E}(F))^2 \quad (55)$$

$$\le \frac{1}{N^2}\left(\sum_k |F(k)| + \delta_k\right)\left(\sum_j \frac{F^2(j)}{|F(j)| - |\delta_j|}\right) - (\mathbb{E}(F))^2$$

$$\le \frac{1}{N^2}\left(\sum_k |F(k)| + |\delta_k|\right)\left(\sum_j |F(j)| + 2|\delta_j|\right) - (\mathbb{E}(F))^2$$

$$= \frac{1}{N^2}\left(\sum_k |\delta_k|\right)\left(\sum_j |F(j)| + 2|\delta_j|\right) +$$

$$\frac{1}{N^2}\left(\sum_k |F(k)|\right)\left(2\sum_j |\delta_j|\right) + (\mathbb{E}(|F|))^2 - (\mathbb{E}(F))^2$$

$$\le \frac{4}{N^2}\left(\sum_k |\delta_k|\right)\left(\sum_j |F(j)|\right) + \mathbb{V}_{f_{opt}}(F).$$

This bound is tight in the sense that as $\max_k |\delta_k| \to 0$ the upper bound on the variance converges to $(\mathbb{E}(|F|))^2 - (\mathbb{E}(F))^2$ which is the optimal attainable variance.

In applications such as quantum chemistry simulation, what one wants to do is minimize the variance in Lemma 2. This minimum variance could be attained by choosing $f(j) \propto |\langle \psi | H_j | \psi \rangle|$. However, the task of computing such a functional is at least as hard as solving the eigenvalue estimation problem that one wants to tackle. The natural approach to take is to take inspiration from Lemma 10 and instead take $f(j) \propto |\langle \tilde{\psi}|H_j|\tilde{\psi}\rangle|$ where $|\tilde{\psi}\rangle$ is an efficiently computable ansatz state such as a CISD state. In practice, however, the importance of a given term may not be entirely predicted by the ansatz prediction. In which case a hedging strategy can be used wherein for some $\rho \in [0, 1]$, $f(j) \propto (1-\rho)\langle H_j\rangle + \rho\|H_j\|$. This strategy allows you to smoothly interpolate between importance dictated by the magnitude of the Hamiltonian terms as well as the expectation value in the surrogate for the groundstate.

VIII. Numerical Results

This disclosure has shown that it is possible to use iterative phase estimation using a randomized Hamiltonian. To show how effective example embodiments can be, two examples of diatomic molecules, dilithium and hydrogen chloride, are considered. In both cases, the molecules are prepared in a minimal STO6G basis and use CISD states found by variationally minimizing the groundstate energy over all states within 2 excitations away from the Hartree Fock state. One can then randomly sample Hamiltonians terms and then examine several quantities of interest including the average groundstate energy, the variance in the groundstate energies and the average number of terms in the Hamiltonian. Interestingly, one can also look at the number of qubits present in the model. This can differ because some randomly sampled Hamiltonians will actually choose terms in the Hamiltonian that do not couple with the remainder of the system. In these cases, the number of qubits required to represent the state can in fact be lower than the total number that would be ordinarily expected.

One can see in FIGS. 2-5 and FIGS. 6-9 that the estimates of the ground state energy varies radically with the degree of hedging used. It is found that if $\rho=1$ for both cases then in all cases, one has a very large variance in the groundstate energy, as expected since importance sampling has very little impact in that case. Conversely, it is found that is one takes $\rho=0$, one can maximally privilege the importance of Hamiltonian terms from the CISD state which leads to very concise models but with shifts in groundstate energies that are on the order of 1 Ha for even $10^7$ randomly selected terms (some of which may be duplicates). If one instead use a modest amount of hedging ($\rho=2\times10^{-5}$) then one notices that the shift in the ground state energy is minimized assuming that a shift in energy of 10%; of chemical accuracy or 0.1 mHa is acceptable for Hamiltonian truncation error. For dilithium, this represents a 30% reduction in the number of terms in the Hamiltonian; whereas for HCl this reduces the number of terms in the Hamiltonian by a factor of 3. Since the cost of a Trotter-Suzuki simulation of chemistry scales super-linearly with the number of terms in the Hamiltonian this constitutes a substantial reduction in the complexity.

One can also note that for the case of dilithium, the number of qubits needed to perform the simulation varied over the different runs. In contrast Chlorine showed no such behavior. This difference arises from the fact that dilithium requires six electrons that reside in 20 spin orbitals. Hydrogen Chloride consists of eighteen electrons and the example Fock space consists of 20 spin orbitals also. As a result, nearly every spin orbital will be relevant in that which explains why the number of spin orbitals needed to express dilithium to a fixed degree of precision changes whereas it does not for HCl. This illustrates that embodiments of the disclosed randomization procedure can be used to help select an active space for a simulation on the fly as the precision needed in the Hamiltonian increases through a phase estimation procedure.

FIGS. 2-9 comprise graphs 200, 300, 400, 500, 600, 700, 800, and 900 that show the average ground energy shift (compared to unsampled Hamiltonian), variance in ground energies over sampled Hamiltonians, average qubit requirement, and average number of terms in sampled Hamiltonians for $Li_2$, as a function of number of samples taken to generate the Hamiltonian and the value of the parameter $\rho$. A term in the Hamiltonian $H_\alpha$ is sampled with probability $\rho_\alpha \propto (1-\rho)\langle H_\alpha\rangle + \rho\|H_\alpha\|$, where the expectation value is taken with the CISD state.

IX. Example Embodiments

In this section, example methods for performing the disclosed technology are disclosed. The particular embodiments described should not be construed as limiting, as the disclosed method acts can be performed alone, in different orders, or at least partially simultaneously with one another. Further, any of the disclosed methods or method acts can be performed with any other methods or method acts disclosed herein.

Figure 10:
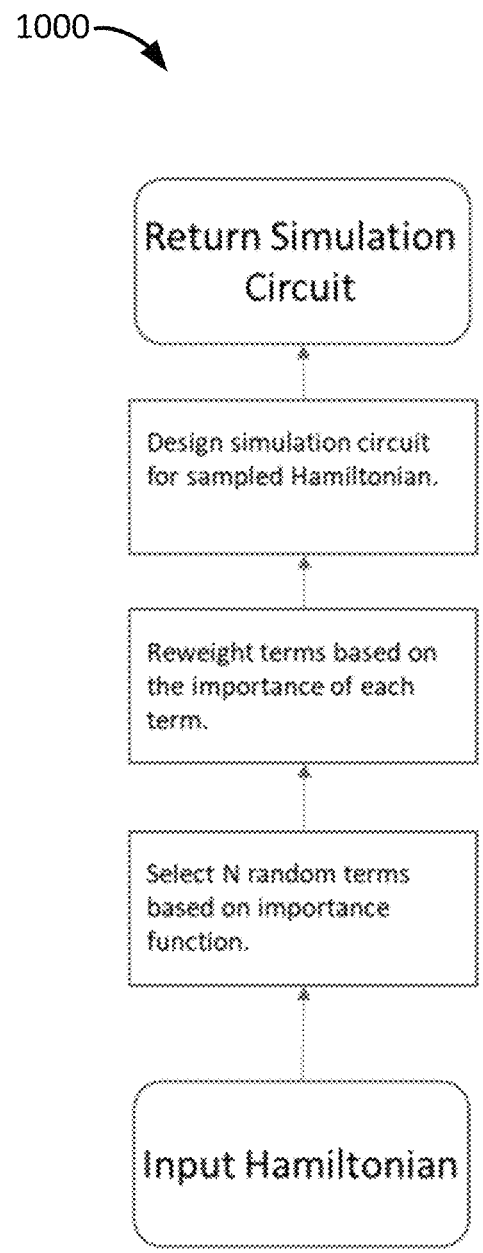
FIG. 10 is a flow chart showing an example method for implementing an importance sampling simulation method according to an embodiment of the disclosed technology.

FIG. 10 is a flow chart 1000 showing an example method for implementing an importance sampling simulation method according to an embodiment of the disclosed technology.

Figure 11:
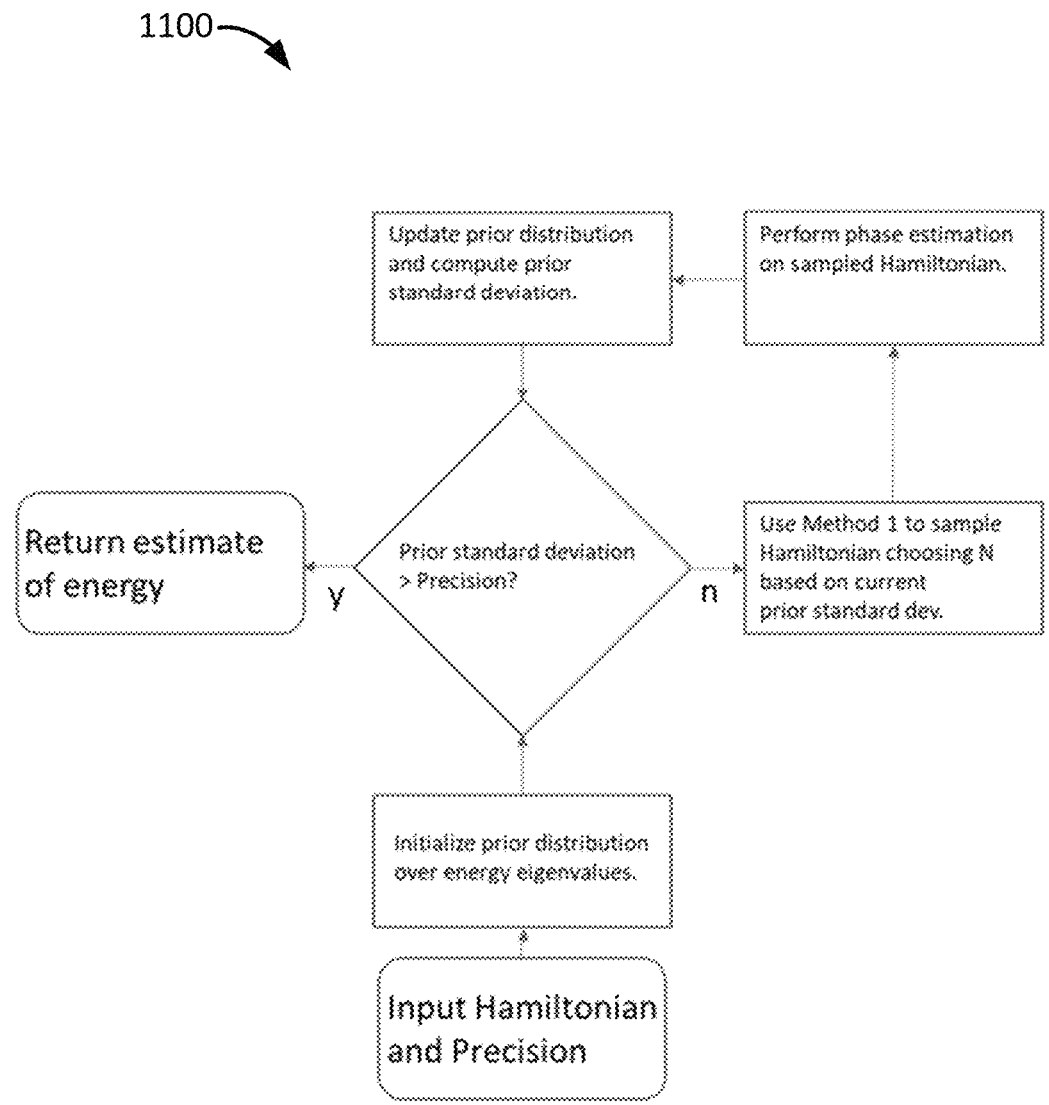
FIG. 11 is a flow chart showing an example method for performing a quantum simulation using adaptive Hamiltonian randomization.

FIG. 11 is a flow chart 1100 showing an example method for performing a quantum simulation using adaptive Hamiltonian randomization.

Figure 16:
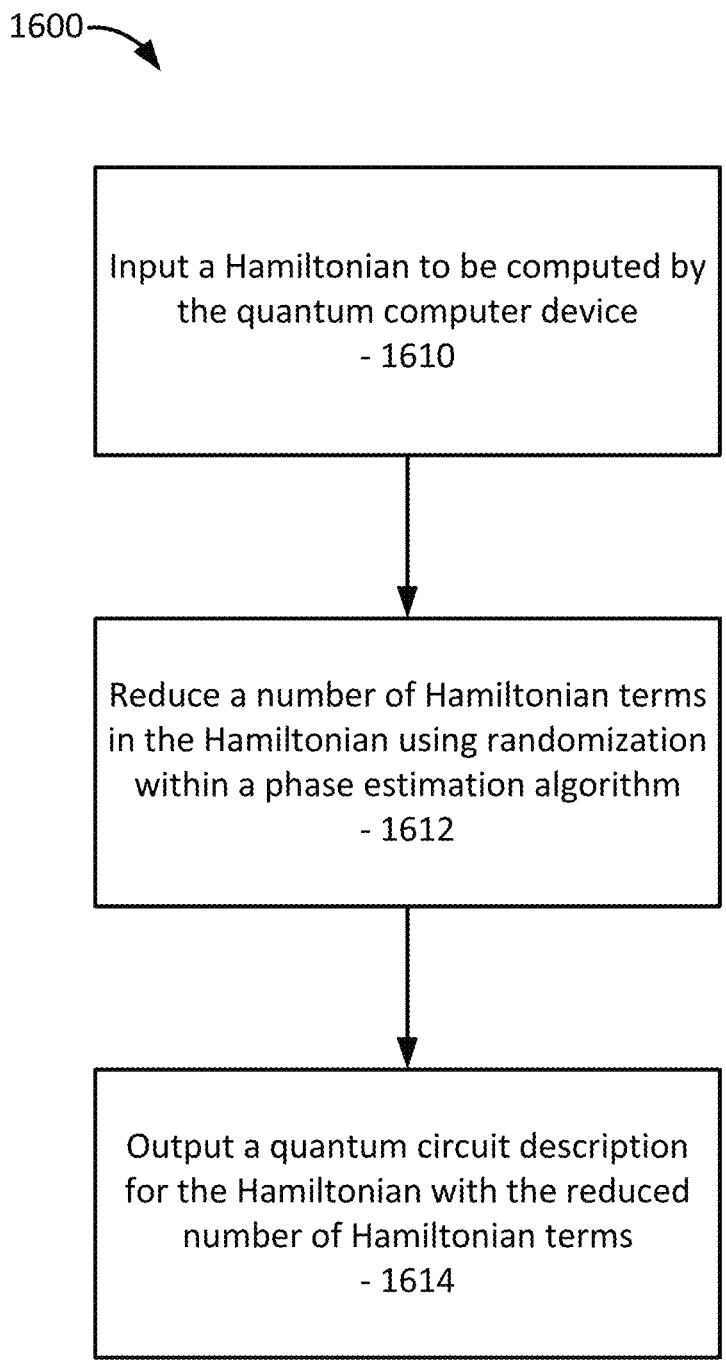
FIG. 16 is a flow chart showing an example method for performing a quantum simulation using adaptive Hamiltonian randomization.

FIG. 16 is a flow chart 1600 showing an example method for performing a quantum simulation using adaptive Hamiltonian randomization.

At 1610, a Hamiltonian to be computed by the quantum computer device is inputted.

At 1612, a number of Hamiltonian terms in the Hamiltonian is reduced using randomization within a phase estimation algorithm.

At 1614, a quantum circuit description for the Hamiltonian is output with the reduced number of Hamiltonian terms.

In certain embodiments, the reducing comprises selecting one or more random Hamiltonian terms based on an importance function; reweighting the selected random Hamiltonian terms based on an importance of each of the selected Hamiltonian random terms; and generating the quantum circuit description using the reweighted random terms. Some embodiments further comprise implementing, in the quantum computing device, a quantum circuit as described by the quantum circuit description; and measuring a quantum state of the quantum circuit. Still further embodiments comprise re-performing the method based on results from the measuring (e.g., using an iterative process). In some embodiments, the iterative process comprises computing a desired precision value for the Hamiltonian; computing a standard deviation for the Hamiltonian based on results from the implementing and measuring; and comparing the desired precision value to the standard deviation. Some embodiments further comprise changing an order of the Hamiltonian terms based on the reducing. Certain embodiments further comprise applying importance functions to terms of the Hamiltonian in a ground state; and selecting one or more random Hamiltonian terms based at least in part on the importance functions. Some embodiments comprise using importance sampling based on a variational approximation to a groundstate. Certain embodiments further comprise using adaptive Bayesian methods to quantify a precision needed for the Hamiltonian given an estimate of the current uncertainty in an eigenvalue.

Other embodiments comprise one or more computer-readable media storing computer-executable instructions, which when executed by a computer cause the computer to perform a method comprising inputting a Hamiltonian to be computed by the quantum computer device; reducing a number of Hamiltonian terms in the Hamiltonian using randomization within a phase estimation algorithm; and outputting a quantum circuit description for the Hamiltonian with the reduced number of Hamiltonian terms.

The method can comprise selecting one or more random Hamiltonian terms based on an importance function; reweighting the selected random Hamiltonian terms based on an importance of each of the selected Hamiltonian random terms; and generating the quantum circuit description using the reweighted random terms. The method can further comprise causing a quantum circuit as described by the quantum circuit description to implemented by the quantum computing device; and measuring a quantum state of the quantum circuit. The method can further comprise computing a desired precision value for the Hamiltonian; computing a standard deviation for the Hamiltonian based on results from the implementing and measuring; comparing the desired precision value to the standard deviation; and re-performing the reducing based on a result of the comparing.

Another embodiment is a system, comprising a quantum computing system; and a classical computing system configured to communicate with and control the quantum computing system. In such embodiments, the classical computing system is further configured to: input a Hamiltonian to be computed by the quantum computer device; reduce a number of Hamiltonian terms in the Hamiltonian using randomization within an iterative phase estimation algorithm; and output a quantum circuit description for the Hamiltonian with the reduced number of Hamiltonian terms. The classical computing system can be further configured to: select one or more random Hamiltonian terms based on an importance function; reweight the selected random Hamiltonian terms based on an importance of each of the selected Hamiltonian random terms; and generate the quantum circuit description using the reweighted random terms. The classical computing system can be further configured to cause a quantum circuit as described by the quantum circuit description to be implemented by the quantum computing device; and measure a quantum state of the quantum circuit. Still further, the classical computing system can be further configured to compute a desired precision value for the Hamiltonian; compute a standard deviation for the Hamiltonian based on results from the implementing and measuring; compare the desired precision value to the standard deviation; and re-perform the reducing based on a result of the comparing. In still further embodiments, the classical computing system can be further configured such that, as part of the randomization, one or more unnecessary qubits are omitted.

X. Example Computing Environments

Figure 12:
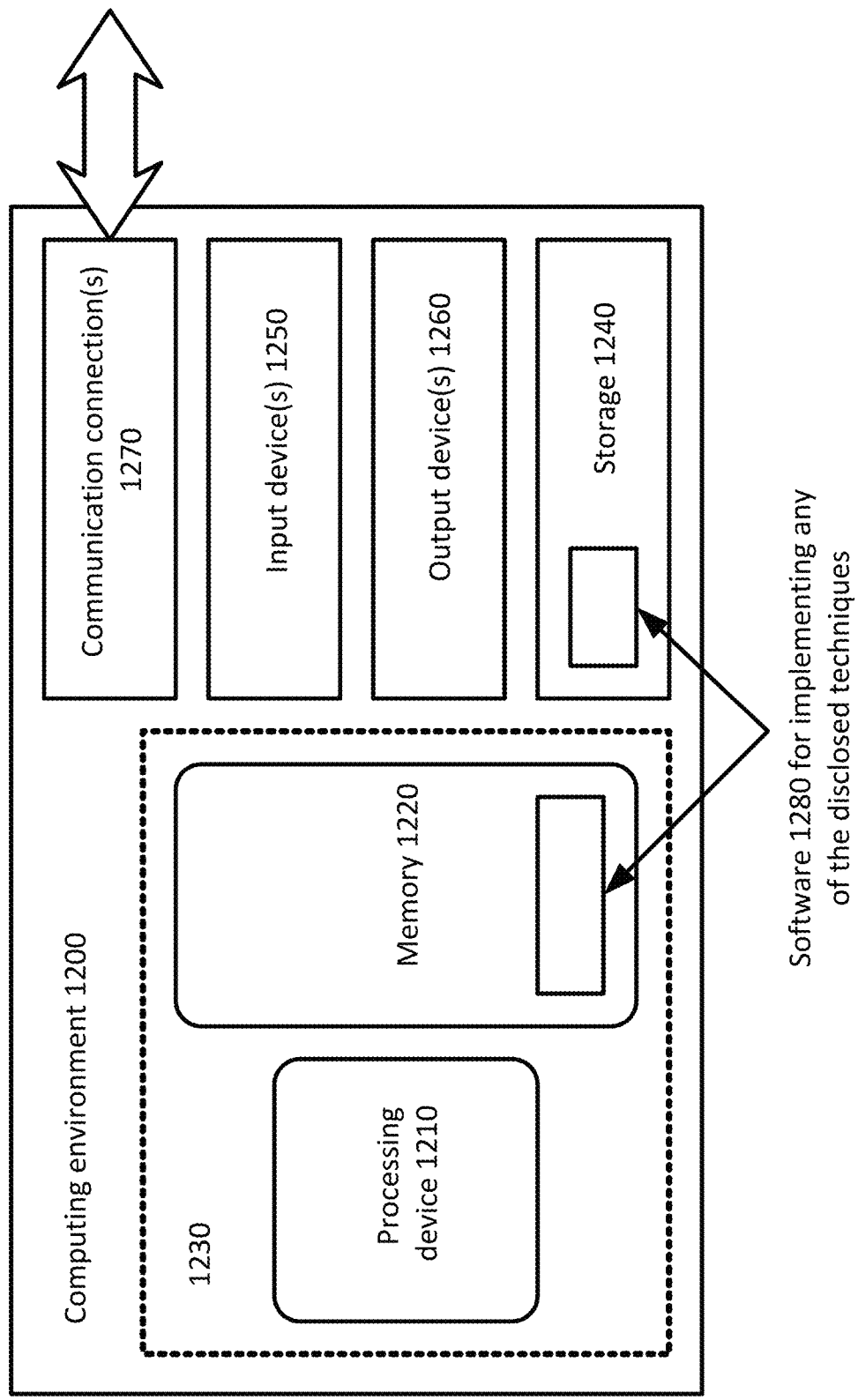
FIG. 12 illustrates a generalized example of a suitable classical computing environment in which aspects of the described embodiments can be implemented.

FIG. 12 illustrates a generalized example of a suitable classical computing environment 1200 in which aspects of the described embodiments can be implemented. The computing environment 1200 is not intended to suggest any limitation as to the scope of use or functionality of the disclosed technology, as the techniques and tools described herein can be implemented in diverse general-purpose or special-purpose environments that have computing hardware.

With reference to FIG. 12, the computing environment 1200 includes at least one processing device 1210 and memory 1220. In FIG. 12, this most basic configuration 1230 is included within a dashed line. The processing device 1210 (e.g., a CPU or microprocessor) executes computer-executable instructions. In a multi-processing system, multiple processing devices execute computer-executable instructions to increase processing power. The memory 1220 may be volatile memory (e.g., registers, cache, RAM, DRAM, SRAM), non-volatile memory (e.g., ROM, EEPROM, flash memory), or some combination of the two. The memory 1220 stores software 1280 implementing tools for performing any of the disclosed techniques for operating a quantum computer to perform Hamiltonian randomization as described herein. The memory 1220 can also store software 1280 for synthesizing, generating, or compiling quantum circuits for performing any of the disclosed techniques.

The computing environment can have additional features. For example, the computing environment 1200 includes storage 1240, one or more input devices 1250, one or more output devices 1260, and one or more communication connections 1270. An interconnection mechanism (not shown), such as a bus, controller, or network, interconnects the components of the computing environment 120). Typically, operating system software (not shown) provides an operating environment for other software executing in the computing environment 1200, and coordinates activities of the components of the computing environment 1200.

The storage 1240 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 1200. The storage 1240 can also store instructions for the software 1280 implementing any of the disclosed techniques. The storage 1240 can also store instructions for the software 1280 for generating and/or synthesizing any of the described techniques, systems, or quantum circuits.

The input device(s) 1250 can be a touch input device such as a keyboard, touchscreen, mouse, pen, trackball, a voice input device, a scanning device, or another device that provides input to the computing environment 1200. The output device(s) 1260 can be a display device (e.g., a computer monitor, laptop display, smartphone display, tablet display, netbook display, or touchscreen), printer, speaker, or another device that provides output from the computing environment 1200.

The communication connection(s) 1270 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods and techniques for performing Hamiltonian randomization, for controlling a quantum computing device, to perform circuit design or compilation/synthesis as disclosed herein can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 1220 and/or storage 1240, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 13:
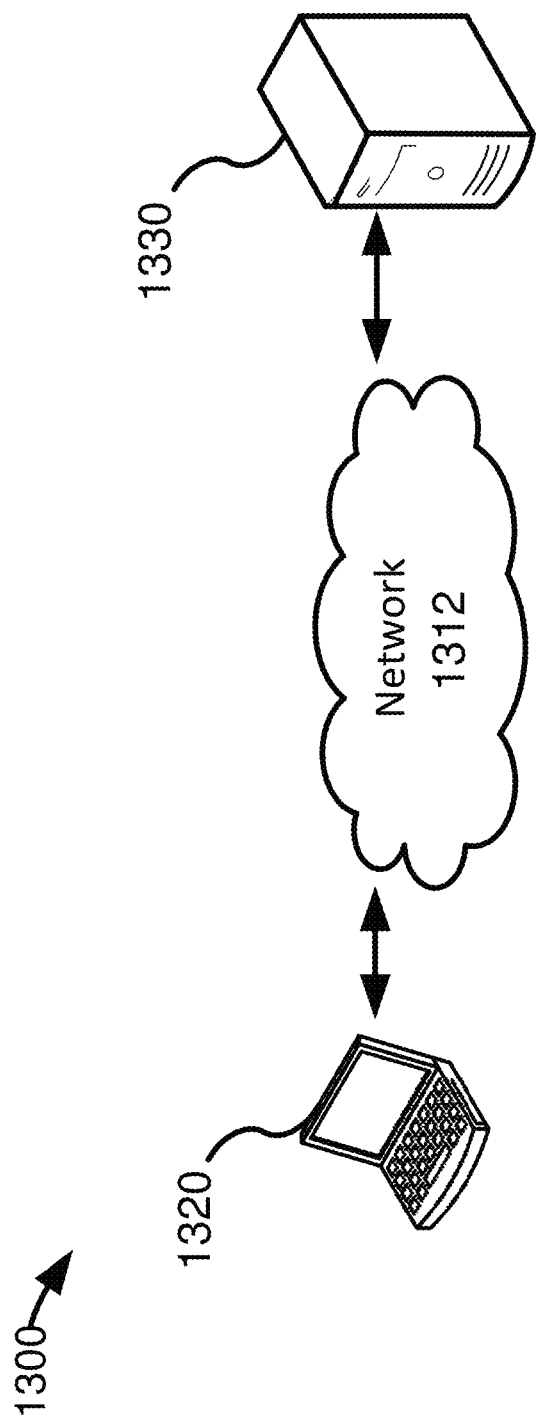
FIG. 13 shows an example of a possible network topology (e.g., a client-server network) for implementing a system according to the disclosed technology.

An example of a possible network topology 1300 (e.g., a client-server network) for implementing a system according to the disclosed technology is depicted in FIG. 13. Networked computing device 1320 can be, for example, a computer running a browser or other software connected to a network 1312. The computing device 1320 can have a computer architecture as shown in FIG. 12 and discussed above. The computing device 1320 is not limited to a traditional personal computer but can comprise other computing hardware configured to connect to and communicate with a network 1312 (e.g., smart phones, laptop computers, tablet computers, or other mobile computing devices, servers, network devices, dedicated devices, and the like). Further, the computing device 1320 can comprise an FPGA or other programmable logic device. In the illustrated embodiment, the computing device 1320 is configured to communicate with a computing device 1330 (e.g., a remote server, such as a server in a cloud computing environment) via a network 1312. In the illustrated embodiment, the computing device 1320 is configured to transmit input data to the computing device 1330, and the computing device 1330 is configured to implement a technique for controlling a quantum computing device to perform any of the disclosed embodiments and/or a circuit generation/compilation/synthesis technique for generating quantum circuits for performing any of the techniques disclosed herein. The computing device 1330 can output results to the computing device 1320. Any of the data received from the computing device 1330 can be stored or displayed on the computing device 1320 (e.g., displayed as data on a graphical user interface or web page at the computing devices 1320). In the illustrated embodiment, the illustrated network 1312 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 1312 can be the Internet or a similar public network and operate using an appropriate protocol (e.g., the HTTP protocol).

Figure 14:
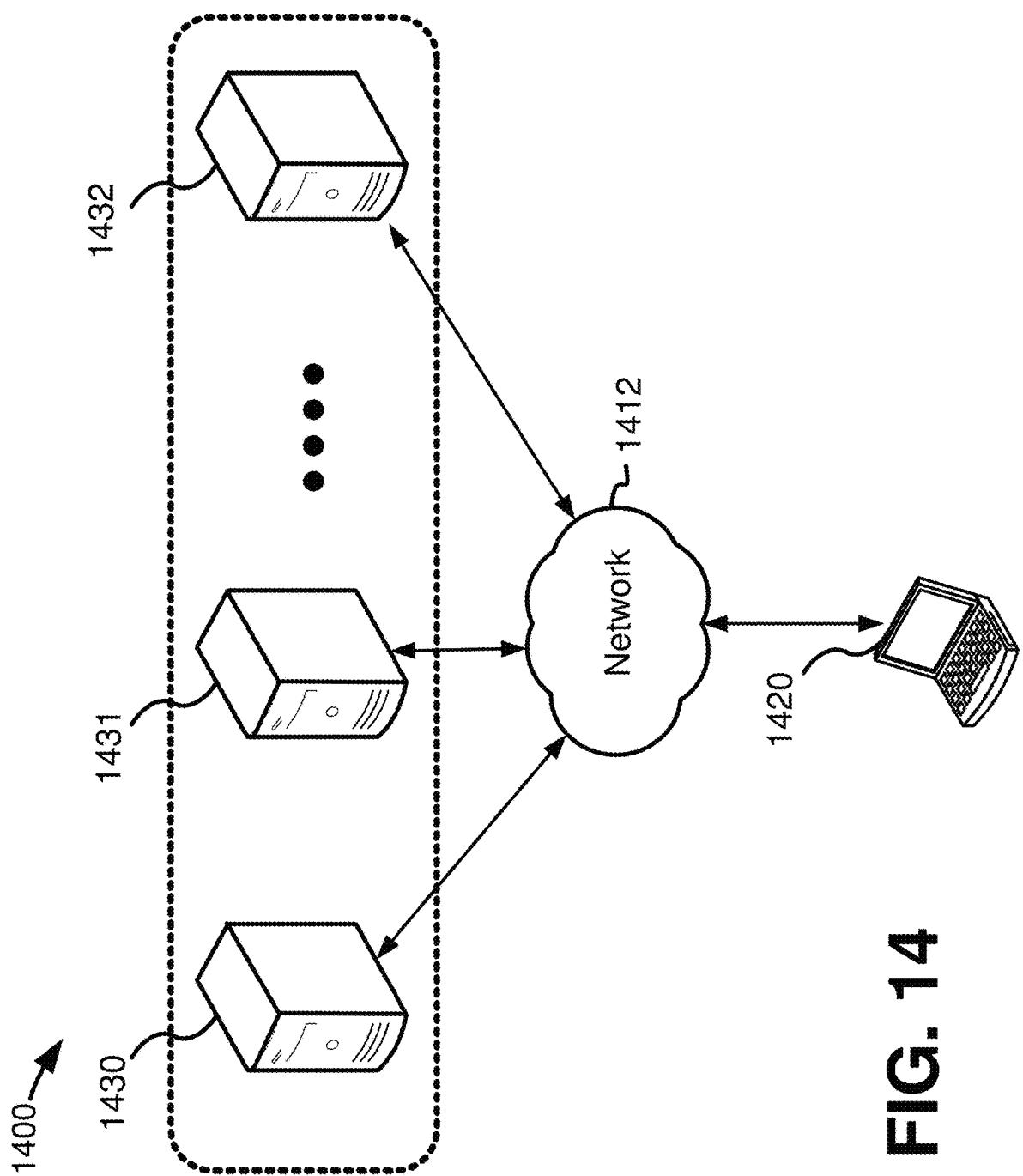
FIG. 14 shows another example of a possible network topology (e.g., a distributed computing environment) for implementing a system according to the disclosed technology.

Another example of a possible network topology 1400 (e.g., a distributed computing environment) for implementing a system according to the disclosed technology is depicted in FIG. 14. Networked computing device 1420 can be, for example, a computer running a browser or other software connected to a network 1412. The computing device 1420 can have a computer architecture as shown in FIG. 12 and discussed above. In the illustrated embodiment, the computing device 1420 is configured to communicate with multiple computing devices 1430, 1431, 1432 (e.g., remote servers or other distributed computing devices, such as one or more servers in a cloud computing environment) via the network 1412. In the illustrated embodiment, each of the computing devices 1430, 1431, 1432 in the computing environment 1400 is used to perform at least a portion of the Hamiltonian randomization technique and/or at least a portion of the technique for controlling a quantum computing device to perform any of the disclosed embodiments and/or a circuit generation/compilation/synthesis technique for generating quantum circuits for performing any of the techniques disclosed herein. In other words, the computing devices 1430, 1431, 1432 form a distributed computing environment in which aspects of the techniques for performing any of the techniques as disclosed herein and/or quantum circuit generation/compilation/synthesis processes are shared across multiple computing devices. The computing device 1420 is configured to transmit input data to the computing devices 1430, 1431, 1432, which are configured to distributively implement such as process, including performance of any of the disclosed methods or creation of any of the disclosed circuits, and to provide results to the computing device 1420. Any of the data received from the computing devices 1430, 1431, 1432 can be stored or displayed on the computing device 1420 (e.g., displayed as data on a graphical user interface or web page at the computing devices 1420). The illustrated network 1412 can be any of the networks discussed above with respect to FIG. 13.

Figure 15:
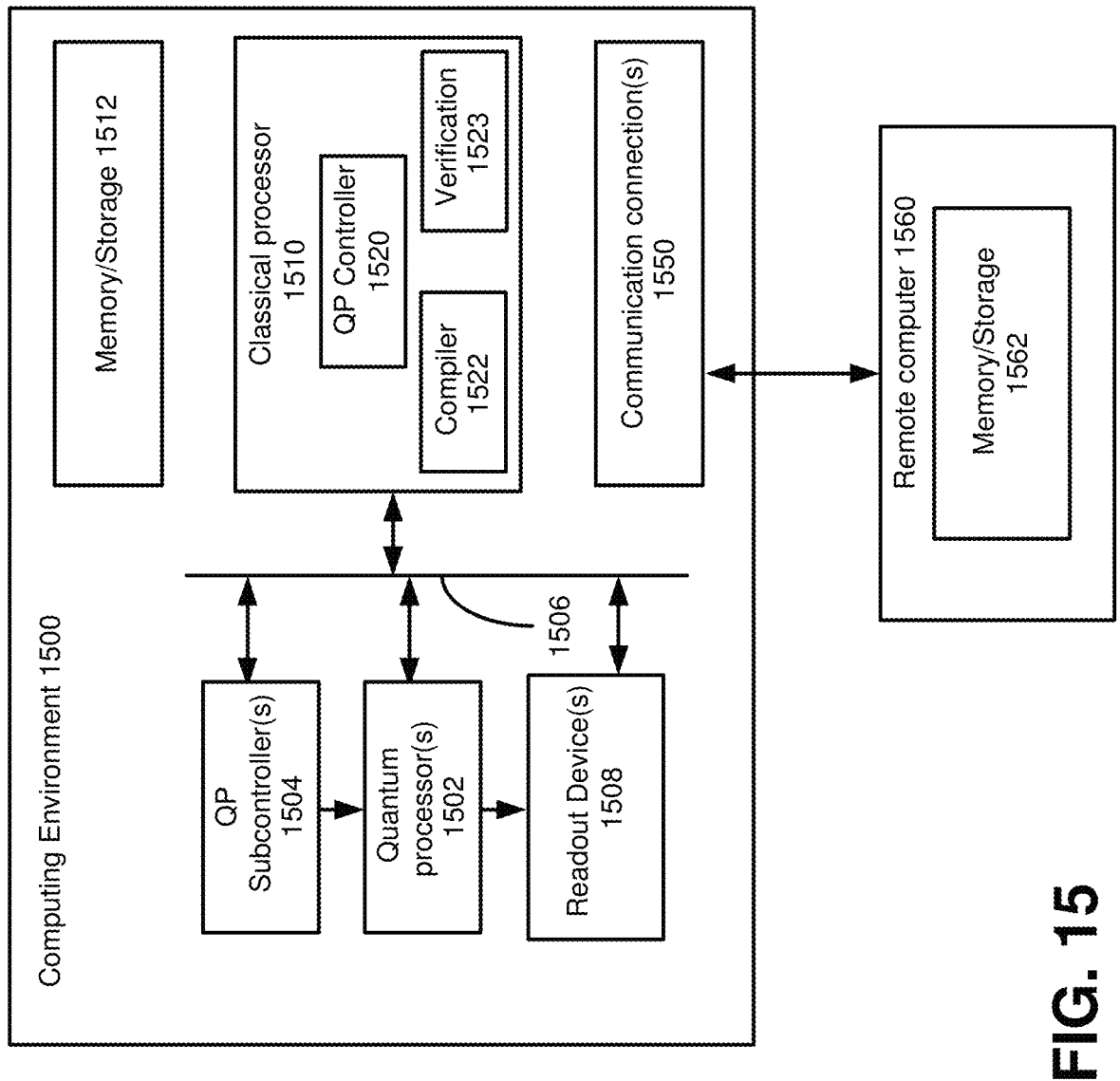
FIG. 15 shows an exemplary system for implementing the disclosed technology.

With reference to FIG. 15, an exemplary system for implementing the disclosed technology includes computing environment 1500. In computing environment 1500, a compiled quantum computer circuit description (including quantum circuits for performing any of the disclosed techniques as disclosed herein) can be used to program (or configure) one or more quantum processing units such that the quantum processing unit(s) implement the circuit described by the quantum computer circuit description.

The environment 1500 includes one or more quantum processing units 1502 and one or more readout device(s) 1508. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 1506 at the control of quantum processor controller 1520. The quantum processor controller (QP controller) 1520 can operate in conjunction with a classical processor 1510 (e.g., having an architecture as described above with respect to FIG. 12) to implement the desired quantum computing process. In the illustrated example, the QP controller 1520 further implements the desired quantum computing process via one or more QP subcontrollers 1504 that are specially adapted to control a corresponding one of the quantum processor(s) 1502. For instance, in one example, the quantum controller 1520 facilitates implementation of the compiled quantum circuit by sending instructions to one or more memories (e.g., lower-temperature memories), which then pass the instructions to low-temperature control unit(s) (e.g., QP subcontroller(s) 1504) that transmit, for instance, pulse sequences representing the gates to the quantum processing unit(s) 1502 for implementation. In other examples, the QP controller(s) 1520 and QP subcontroller(s) 1504 operate to provide appropriate magnetic fields, encoded operations, or other such control signals to the quantum processor(s) to implement the operations of the compiled quantum computer circuit description. The quantum controller(s) can further interact with readout devices 1508 to help control and implement the desired quantum computing process (e.g., by reading or measuring out data results from the quantum processing units once available, etc.)

With reference to FIG. 15, compilation is the process of translating a high-level description of a quantum algorithm into a quantum computer circuit description comprising a sequence of quantum operations or gates, which can include the circuits as disclosed herein (e.g., the circuits configured to perform one or more of the procedures as disclosed herein). The compilation can be performed by a compiler 1522 using a classical processor 1510 (e.g., as shown in FIG. 12) of the environment 1500 which loads the high-level description from memory or storage devices 1512 and stores the resulting quantum computer circuit description in the memory or storage devices 1512.

In other embodiments, compilation and/or verification can be performed remotely by a remote computer 1560 (e.g., a computer having a computing environment as described above with respect to FIG. 12) which stores the resulting quantum computer circuit description in one or more memory or storage devices 1562 and transmits the quantum computer circuit description to the computing environment 1500 for implementation in the quantum processing unit(s) 1502. Still further, the remote computer 1500 can store the high-level description in the memory or storage devices 1562 and transmit the high-level description to the computing environment 1500 for compilation and use with the quantum processor(s). In any of these scenarios, results from the computation performed by the quantum processor(s) can be communicated to the remote computer after and/or during the computation process. Still further, the remote computer can communicate with the QP controller(s) 1520 such that the quantum computing process (including any compilation, verification, and QP control procedures) can be remotely controlled by the remote computer 1560. In general, the remote computer 1560 communicates with the QP controller(s) 1520, compiler/synthesizer 1522, and/or verification tool 1523 via communication connections 1550.

In particular embodiments, the environment 1500 can be a cloud computing environment, which provides the quantum processing resources of the environment 1500 to one or more remote computers (such as remote computer 1560) over a suitable network (which can include the internet).

XI. Concluding Remarks

This application has shown that iterative phase estimation is more flexible than it previously may have been thought and that the number of terms in the Hamiltonian be randomized at each step of iterative phase estimation without substantially contributing to the underlying variance of an unbiased estimator of the eigenphase. It was further shown numerically that by using such strategies for sub-sampling the Hamiltonian terms that one can perform a simulation using fewer Hamiltonian terms than would be necessary for traditional approaches require. These reductions in the number of terms directly impact the complexity of Trotter-Suzuki based simulation and indirectly impact qubitization and truncated Taylor series simulation methods because they also reduce the 1-norm of the vector of Hamiltonian terms.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

The invention claimed is:

1. A method of operating a quantum computing device, comprising:
    inputting a Hamiltonian to be computed by the quantum computing device;
    reducing a number of Hamiltonian terms in the Hamiltonian using randomization within a phase estimation algorithm; and
    outputting a quantum circuit description for the Hamiltonian with the reduced number of Hamiltonian terms.

2. The method of claim 1, wherein the method is performed by a classical computer.

3. The method of claim 1, wherein the reducing comprises:
    selecting one or more random Hamiltonian terms based on an importance function;
    reweighting the selected random Hamiltonian terms based on an importance of each of the selected random Hamiltonian terms;
    generate the quantum circuit description using the reweighted random terms.

4. The method of claim 3, further comprising:
    implementing, in the quantum computing device, a quantum circuit as described by the quantum circuit description;
    measuring a quantum state of the quantum circuit.

5. The method of claim 4, further comprising re-performing the method of claim 4 based on results from the measuring.

6. The method of claim 5, herein the re-performing is performed based on an iterative process.

7. The method of claim 6, wherein the iterative process comprises:
    computing a desired precision value for the Hamiltonian;
    computing a standard deviation for the Hamiltonian based on results from the implementing and measuring; and
    comparing the desired precision value to the standard deviation.

8. The method of claim 1, further comprising changing an order of the Hamiltonian terms based on the reducing.

9. The method of claim 1, further comprising:
    applying importance functions to terms of the Hamiltonian in a ground state; and
    selecting one or more random Hamiltonian terms based at least in part on the importance functions.

10. The method of claim 1, further comprising:
using importance sampling based on a variational approximation to a groundstate.

11. The method of claim 1, further comprising:
using adaptive Bayesian methods to quantify a precision needed for the Hamiltonian given an estimate of the current uncertainty in an eigenvalue.

12. One or more computer-readable media storing computer-executable instructions, which when executed by a computer cause the computer to perform a method, the method comprising:
inputting a Hamiltonian to be computed by a quantum computer device;
reducing a number of Hamiltonian terms in the Hamiltonian using randomization within a phase estimation algorithm; and
outputting a quantum circuit description for the Hamiltonian with the reduced number of Hamiltonian terms.

13. The one or more computer-readable media of claim 12, wherein the method further comprises:
selecting one or more random Hamiltonian terms based on an importance function;
reweighting the selected random Hamiltonian terms based on an importance of each of the selected random Hamiltonian terms; and
generating the quantum circuit description using the reweighted random terms.

14. The one or more computer-readable media of claim 13, wherein the method further comprises:
causing a quantum circuit as described by the quantum circuit description to be implemented by the quantum computing device; and
measuring a quantum state of the quantum circuit.

15. The one or more computer-readable media of claim 14, wherein the method further comprises:
computing a desired precision value for the Hamiltonian;
computing a standard deviation for the Hamiltonian based on results from the implementing and measuring;
comparing the desired precision value to the standard deviation; and
re-performing the reducing based on a result of the comparing.

16. A system, comprising:
a quantum computing system; and
a classical computing system configured to communicate with and control the quantum computing system, the classical computing system being further configured to:
input a Hamiltonian to be computed by the quantum computing system;
reduce a number of Hamiltonian terms in the Hamiltonian using randomization within an iterative phase estimation algorithm; and
output a quantum circuit description for the Hamiltonian with the reduced number of Hamiltonian terms.

17. The system of claim 16, wherein the classical computing system is further configured to:
select one or more random Hamiltonian terms based on an importance function;
reweight the selected random Hamiltonian terms based on an importance of each of the selected random Hamiltonian terms; and
generate the quantum circuit description using the reweighted random terms.

18. The system of claim 17, wherein the classical computing system is further configured to:
cause a quantum circuit as described by the quantum circuit description to be implemented by the quantum computing device; and
measure a quantum state of the quantum circuit.

19. The system of claim 18, wherein the classical computing system is further configured to:
compute a desired precision value for the Hamiltonian;
compute a standard deviation for the Hamiltonian based on results from the implementing and measuring;
compare the desired precision value to the standard deviation; and
re-perform the reducing based on a result of the comparing.

20. The system of claim 16, wherein the classical computing system is further configured to omit one or more unnecessary qubits based on the reduced number of Hamiltonian terms.

* * * * *